(12) United States Patent
Jennings et al.

(10) Patent No.: US 7,470,086 B2
(45) Date of Patent: Dec. 30, 2008

(54) SUBMERSIBLE TETHERED PLATFORM FOR UNDERSEA ELECTRICAL POWER GENERATION

(76) Inventors: Clifford Allen Jennings, 8075 Green Orchard Rd., Apt 31, Glen Burnie, MD (US) 21061; James Phillip Martin, Jr., 2034 Applegate Dr., Ocoee, FL (US) 34761

( * ) Notice: Subject to any disclaimer, the term of this patent is extended or adjusted under 35 U.S.C. 154(b) by 245 days.

(21) Appl. No.: 11/647,874

(22) Filed: Dec. 29, 2006

(65) Prior Publication Data

US 2007/0231072 A1    Oct. 4, 2007

Related U.S. Application Data

(60) Provisional application No. 60/755,939, filed on Jan. 4, 2006.

(51) Int. Cl.
*E02B 9/08* (2006.01)
(52) U.S. Cl. .......................... 405/76; 405/75; 405/205; 405/224
(58) Field of Classification Search .................. 405/75, 405/76, 203, 205, 206, 209, 224
See application file for complete search history.

(56) References Cited

U.S. PATENT DOCUMENTS 4,333,311 A * 6/1982 Kitabayashi ................. 405/76
4,364,691 A * 12/1982 Wirt ............................ 405/76
6,568,878 B2 * 5/2003 Woodall et al. ............... 405/76
6,695,536 B2 * 2/2004 Sanchez Gomez ........... 405/76

FOREIGN PATENT DOCUMENTS

JP    56010897 A  *  2/1981

* cited by examiner

*Primary Examiner*—Frederick L Lagman

(57) ABSTRACT

A submersible and remotely-operable platform system for carrying out repeated operations in a submarine position, and producing electrical energy as either a primary or secondary purpose by means of one or more energy-conversion payload devices installed thereon. The platform and payload devices may be periodically brought to the surface and thence, if necessary, to a shore-based facility for maintenance or refit. In deployment, the platform is preferably engaged to its mooring lines and electrical cables while still on the surface. Simultaneous with controlled flooding of certain of its volumes, the platform is guided to an operational depth and attitude by the action of its winch assemblies upon their engaged mooring lines. Subsea currents energize the platform's payload of energy conversion devices, the electrical output being preferably conveyed via one or more surface-attached cables to an off-board facility for further processing, distribution, or consumption.

34 Claims, 15 Drawing Sheets

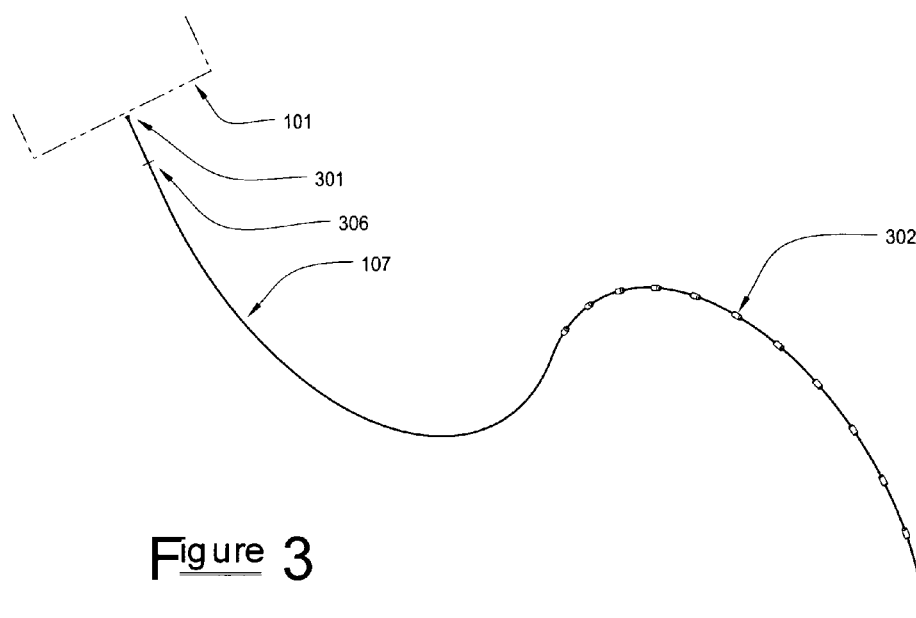
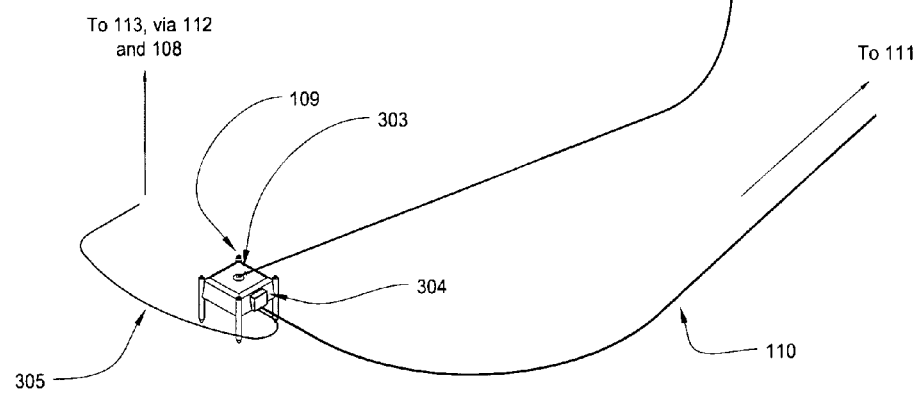
Figure 3

| LINE SYMBOLS | |
|---|---|
| ⸺ | POWER (ACTIVE) |
| ········· | POWER (INACTIVE) |
| ------- | SIGNAL (WIRE) |
| — — — | SIGNAL (WIRELESS) |
| —·—·— | PIPING |

| ABBREVIATIONS | |
|---|---|
| T | TURBINE ASSEMBLY |
| TC | TURBINE CONTROLLER |
| SG | SWITCHGEAR |
| SP | SIGNAL SPLITTER |
| XM | TRANSMITTER / RECEIVER |
| TP | TRANPONDER (ACOUSTIC) |
| WA | WINCH ASSEMBLY |
| PV | PRESSURE VESSEL |
| V | VALVE |
| S | SENSOR |
| C | CABLE |

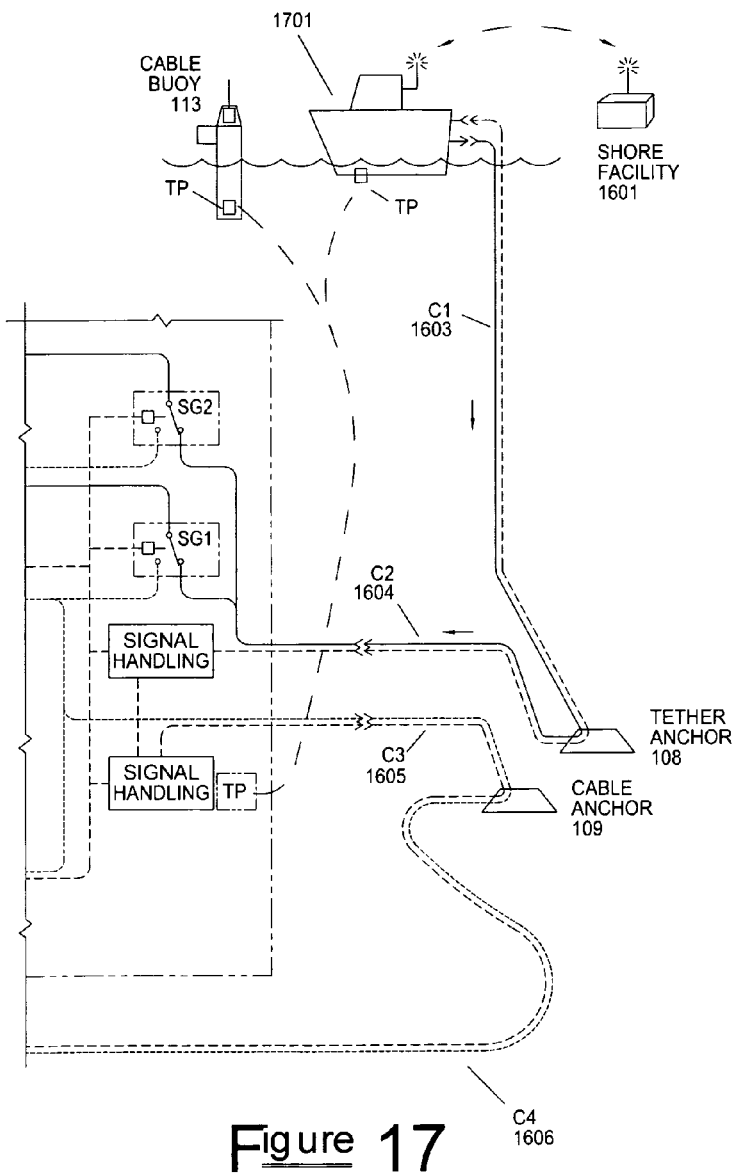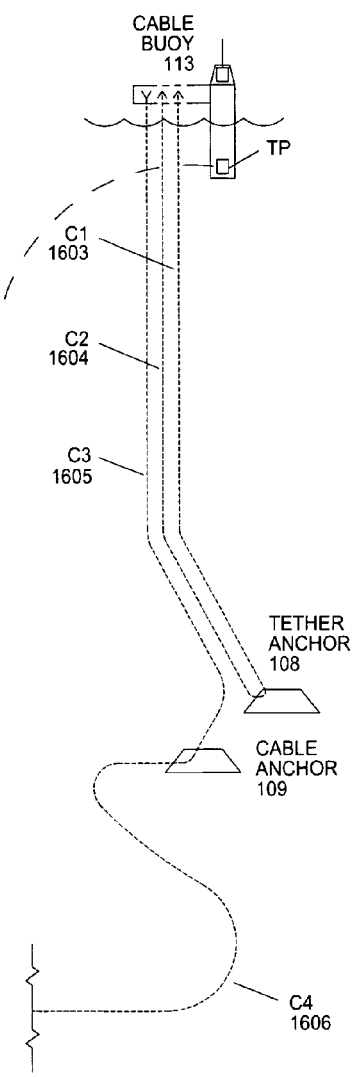
Figure 17
Figure 18

SUBMERSIBLE TETHERED PLATFORM FOR UNDERSEA ELECTRICAL POWER GENERATION

This application claims the benefit of provisional patent application Ser. No. 60/755,939 filed on Jan. 4, 2006.

CROSS-REFERENCES TO RELATED APPLICATIONS

U.S. Patent Documents

| | | | |
|---|---|---|---|
| 328,447 | October 1885 | Brady | 290/43 |
| 365,133 | June 1887 | Kessler | 415/7 |
| 408,075 | July 1889 | Brown | 415/3 |
| 833,361 | October 1906 | Wilmore | 290/43 |
| 867,192 | September 1907 | Dawson | |
| 868,798 | October 1907 | McLaughlin | 416/DIG |
| 950,676 | March 1910 | Price | 415/7 |
| 958,467 | May 1910 | Bennett | 416/122 |
| 969,794 | September 1910 | Miner | 415/126 |
| 974,221 | November 1910 | Wilber | 415/7 |
| 1,109,839 | September 1914 | Henry | 415/7 |
| 1,123,491 | January 1915 | Corbin | 290/54 |
| 1,147,658 | July 1915 | Stokes | 416/85 |
| 1,396,609 | November 1921 | Weisenborn | 415/7 |
| 2,379,324 | June 1945 | Topalov | 415/4 |
| 2,501,696 | March 1950 | Souczek | 416/85 |
| 3,209,156 | September 1965 | Struble, Jr. | 290/54 |
| 3,220,372 | November 1965 | Lehmann | 114/16 |
| 3,293,867 | December 1966 | Dean | 61/72.3 |
| 3,626,703 | December 1971 | Richburg | 61/69 |
| 3,807,890 | April 1974 | Wright | 417/334 |
| 3,922,012 | November 1975 | Herz | 290/54 |
| 3,928,771 | December 1975 | Straumsnes | 290/53 |
| 3,952,349 | April 1976 | Erath et al. | 9/8R |
| 3,973,864 | August 1976 | Atherton | 415/8 |
| 3,978,345 | August 1976 | Bailey | 290/54 |
| 3,986,787 | October 1976 | Mouton, Jr. et al. | 415/7 |
| 4,023,041 | May 1976 | Chappell | 290/53 |
| 4,025,220 | May 1977 | Thompson et al. | 415/7 |
| 4,026,587 | May 1977 | Hultman et al. | 290/53 |
| 4,038,821 | August 1977 | Black | 60/398 |
| 4,095,918 | June 1978 | Mouton et al. | 415/7 |
| 4,160,624 | July 1979 | Smith | 417/330 |
| 4,163,904 | August 1979 | Skendrovic | 290/54 |
| 4,163,905 | August 1979 | Davison | 290/54 |
| 4,205,943 | June 1980 | Vauthier | 416/86 |
| 4,219,303 | August 1980 | Mouton, Jr. et al. | 416/121 |
| 4,224,793 | September 1980 | Gutsfeld | 60/398 |
| 4,256,970 | March 1981 | Tomassini | 290/53 |
| 4,258,271 | March 1981 | Chappell et al. | 290/54 |
| 4,274,009 | June 1981 | Parker, Sr. | 290/43 |
| 4,278,362 | July 1981 | Scherrer | 405/91 |
| 4,301,377 | November 1981 | Rydz | 290/54 |
| 4,306,157 | December 1981 | Wracsaricht | 290/54 |
| 4,313,059 | January 1982 | Howard | 290/54 |
| 4,335,319 | June 1982 | Mettersheimer, Jr. | 290/54 |
| 4,383,182 | May 1983 | Bowley | 290/54 |
| 4,467,218 | August 1984 | Andruszkiw et al. | 290/54 |
| 4,516,033 | May 1985 | Olson | 290/55 |
| 4,524,285 | June 1985 | Rauch | 290/43 |
| 4,557,697 | December 1985 | Kontar et al. | 441/2 |
| 4,590,386 | May 1986 | Wiggs | 290/54 |
| 4,613,279 | September 1986 | Corren et al. | 415/121 |
| 4,720,640 | January 1988 | Anderson et al. | 290/43 |
| 4,722,665 | February 1988 | Tyson | 416/84 |
| 4,748,808 | June 1988 | Hill | 290/54 |
| 4,818,888 | April 1989 | Lenoir, III | 290/43 |
| 4,843,249 | June 1989 | Bussiere | 290/53 |
| 4,850,190 | July 1989 | Pitts | 60/398 |
| 4,860,681 | August 1989 | Svenning | 114/312 |
| 4,864,152 | September 1989 | Pedersen | 290/53 |
| 4,868,408 | September 1989 | Hesh | 290/52 |
| 4,960,363 | October 1990 | Bergstein | 415/3.1 |
| 5,281,856 | January 1994 | Kenderi | 290/54 |
| 5,440,176 | August 1995 | Haining | 290/54 |
| 5,471,098 | November 1995 | Asay | 290/54 |
| 5,798,572 | August 1998 | Lehoczky | 290/43 |
| 5,834,853 | November 1998 | Ruiz et al. | 290/54 |
| 6,006,518 | December 1999 | Geary | 60/398 |
| 6,091,161 | July 2000 | Dehlsen et al. | 290/43 |
| 6,104,097 | August 2000 | Lehoczky | 290/43 |
| 6,109,863 | August 2000 | Milliken | 415/1 |
| 6,168,373 | January 2001 | Vauthier | 415/221 |
| 6,323,563 | November 2001 | Kallenberg, Jr. | 290/42 |
| 6,472,768 | October 2002 | Salls | 290/54 |
| 6,508,191 | January 2003 | Spoljaric | 114/244 |
| 6,531,788 | March 2003 | Robson | 290/43 |
| 6,551,053 | April 2003 | Schuetz | 415/3 |
| 6,734,576 | May 2004 | Pacheco | 290/55 |
| 6,759,757 | July 2004 | Campbell | 290/54 |
| 6,806,586 | October 2004 | Wobben | 290/54 |
| 6,849,963 | February 2005 | Grinsted et al. | 290/42 |
| 6,856,036 | February 2005 | Belinsky | 290/42 |

U.S. Patent Applications

| | | | |
|---|---|---|---|
| 20050099012 | May 2002 | Williams, Jr. | 290/54 |
| 20050132700 | June 2005 | Newman | 60/398 |
| 20050121917 | June 2005 | Kikuchi | 290/53 |
| 20040189010 | September 2004 | Tharp | 290/54 |

Foreign Patent Documents

| | | | |
|---|---|---|---|
| AU2002328217 | April 2003 | Barry, et al. | F03B17/06 |
| WO2005028857 | September 2004 | Perry, et al. | F03B9/00 |
| DE10036314 | February 2002 | Otto, et al. | F03B13/10 |
| DE10134509 | May 2002 | Norman, et al. | F03B13/10 |
| JP7259064 | October 1995 | Iwamoto | E02B9/08 |
| JP2002127988 | May 2002 | Takemoto | B63G8/00 |
| RU2139972 | October 1999 | Nikolaevich | F03B13/10 |

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A "SEQUENCE LISTING," TABLE, ETC.

Not applicable.

BACKGROUND OF THE INVENTION

1. Field of the Invention

The present invention relates to the generation of electrical power by means of hydroelectric conversion devices driven by the flow of ocean currents, and how to present such devices to said current. More specifically, the invention is intended for underwater deployment in the ocean, suspended between the ocean floor and surface by tethered and buoyant means, thereby bringing its power conversion devices into interaction with ocean currents at a selected depth, and in a manner particularly suited to periodic surfacing for maintenance and retrofit. The invention is remotely operated and monitored, flexibly configurable, potentially large in scale, and equipped with redundant means of communication and control, thus providing a composite "power plant" that is practical for the requirements of current-driven energy-conversion devices emplaced in the subsea water column.

In a time when alternative sources of power generation are in clear demand, practical solutions for ongoing and reliable operation in harsh undersea environments have obvious application. Though numerous inventions in this field have been proposed over the last century, the comparative practical benefits of the present invention (when comparable power output and maintenance requirements are considered) include minimal invasiveness to surface traffic or fishing; non-disruption of surface aesthetics; protection of primary equipment from the more violent and unpredictable surface currents and turbulence; ability to defend against more violent aquatic events by means of change in attitude or depth or by recall of the entire platform; and, most importantly, the ability to readily access the equipment in order to keep it functional and up-to-date. Furthermore, the present invention comprises a true system, embracing within its boundaries such practical and critical factors as mechanical deployment, station-keeping and retrieval, cable management, conveyance of power to shore, and a redundancy of communications means.

2. Description of Related Art

The proposition of harnessing ocean currents for the purposes of electrical power generation has a long history, beginning with surface currents being engaged by paddlewheel-type devices (either horizontal or vertical) or other means. Such U.S. Pat. No. 328,447 (Brady, 1885); U.S. Pat. No. 365,133 (Kessler, 1887); U.S. Pat. No. 408,075 (Brown, 1889); U.S. Pat. No. 833,361 (Wilmore, 1906); U.S. Pat. No. 867,192 (Dawson, 1907); U.S. Pat. No. 950,676 (Price, 1910); U.S. Pat. No. 958,467 (Bennett, 1910); U.S. Pat. No. 969,794 (Miner, 1910); U.S. Pat. No. 974,221 (Wilber, 1910); U.S. Pat. No. 1,109,839 (Henry, 1914); U.S. Pat. No. 2,379,324 (Topalov, 1945); U.S. Pat. No. 3,807,890 (Wright, 1974); U.S. Pat. No. 3,928,771 (Straumsnes, 1975); U.S. Pat. No. 3,973,864 (Atherton, 1976); U.S. Pat. No. 3,978,345 (Bailey, 1976); U.S. Pat. No. 4,023,041 (Chappell, 1976); U.S. Pat. No. 4,038,821 (Black, 1977); U.S. Pat. No. 4,160,624 (Smith, 1979); U.S. Pat. No. 4,224,793 (Gutsfeld, 1980); U.S. Pat. No. 4,301,377 (Rydz, 1981); U.S. Pat. No. 4,313,059 (Howard, 1982); U.S. Pat. No. 4,467,218 (Andruszkiw et al., 1984); U.S. Pat. No. 4,516,033 (Olson, 1985); U.S. Pat. No. 4,818,888 (Lenoir, III, 1989); U.S. Pat. No. 4,843,249 (Bussiere, 1989); U.S. Pat. No. 5,281,856 (Kenderi, 1994); U.S. Pat. No. 5,471,098 (Asay, 1995); U.S. Pat. No. 5,834,853 (Ruiz et al., 1998); U.S. Pat. No. 6,551,053 (Schuetz, 2003); U.S. Pat. No. 6,734,576 (Pacheco, 2004); U.S. Pat. No. 6,759,757 (Campbell, 2004); and U.S. Pat. No. 6,856,036 (Belinsky, 2005). Such inventions are indicative of the long-standing quest for conversion of kinetic energy in the ocean current into electrical energy. The same could be demonstrated for devices energized by the oscillatory nature of surface wave action; but as the present invention relates to subsurface current-based energy conversion, such need not be invoked herein.

Other surface (or near-surface) inventions have been patented involving specifically turbine (as opposed to, e.g., paddlewheel means) inventions for power generation: U.S. Pat. No. 1,147,658 (Stokes, 1915); U.S. Pat. No. 1,396,609 (Weisenborn, 1921); U.S. Pat. No. 3,986,787 (Mouton, Jr. et al., 1976); U.S. Pat. No. 4,095,918 (Mouton et al., 1978); U.S. Pat. No. 4,590,386 (Wiggs, 1986); U.S. Pat. No. 4,722,665 (Tyson, 1988); U.S. Pat. No. 4,864,152 (Pedersen, 1989); U.S. Pat. No. 5,798,572 (Lehoczky, 1998); U.S. Pat. No. 6,508,191 (Spoljaric, 2003). These turbine-oriented (that is, in the context of this specification, axially-oriented arrangements of impeller and generator) inventions, from the dates involved, demonstrate the same longevity and prevalence for such an endeavor, lasting into (and with sustained interest) the present time. Also could be cited to further demonstrate the point are explicitly shore-based inventions falling into this category of surface deployment; but as these applications are sufficiently removed from the fully submersed environment and operation of the present invention, such need not be addressed herein.

All such surface or near-surface-oriented inventions rely on mechanical fluidic activity on the surface, and by definition—if employed on a large scale—could present severe disruption to shipping, surface transportation, fisheries, and aesthetics. Further, such inventions are generally inapplicable for a deep-ocean environment in which constant-flow oceanic currents (as opposed to near-shore, tidal or river-based flows) are fully engaged, being precluded by their design via the greater water depths, more severe wave action, and/or distance from shore. The present invention, by contrast, is designed to overcome these obstacles, and harvest energy from strong current activity well beneath the ocean surface, in a practical and maintainable manner.

Specifically submarine power generation by submerged turbine devices is, however, no new goal, as is demonstrated in U.S. Pat. No. 868,798 (McLaughlin, 1907); U.S. Pat. No. 1,123,491 (Corbin, 1915); U.S. Pat. No. 2,501,696 (Souczek, 1950); U.S. Pat. No. 3,209,156 (Struble, Jr., 1965); U.S. Pat. No. 4,025,220 (Thompson et al., 1977); U.S. Pat. No. 4,163,904 (Skendrovic, 1979); U.S. Pat. No. 4,205,943 (Vauthier, 1980); U.S. Pat. No. 4,258,271 (Chappell et al., 1981); U.S. Pat. No. 4,274,009 (Parker, Sr., 1981); U.S. Pat. No. 4,524,285 (Rauch, 1985); U.S. Pat. No. 4,613,279 (Corren et al., 1986); U.S. Pat. No. 4,720,640 (Anderson et al., 1988); U.S. Pat. No. 4,748,808 (Hill, 1988); U.S. Pat. No. 4,868,408 (Hesh, 1989); U.S. Pat. No. 4,960,363 (Bergstein, 1990); U.S. Pat. No. 6,006,518 (Geary, 1999); U.S. Pat. No. 6,091,161 (Dehlsen et al., 2000); U.S. Pat. No. 6,104,097 (Lehoczky, 2000); U.S. Pat. No. 6,109,863 (Milliken, 2000); U.S. Pat. No. 6,168,373 (Vauthier, 2001); U.S. Pat. No. 6,323,563 (Kallenberg, Jr., 2001); U.S. Pat. No. 6,472,768 (Salls, 2002); U.S. Pat. No. 6,806,586 (Wobben, 2004); U.S. Pat. No. 6,849,963 (Grinsted et al., 2005); and foreign patents JP7259064 (1995, Iwamoto); RU2139972 (1999, Nikolaevich); DE10036314 (2002, Otto, et al.); DE10134509 (2002, Norman, et al.); and AU2002328217 (Barry et al., 2003); see also US Patent Applications 2005-0099012 (Williams, Jr., published 2002); 20050121917 (Kikuchi, published 2005); and 20050132700 (Newman, published 2005). As with the prior citations, the escalation of such patents, in view of their grant dates, underscores the apparent and growing necessity of exploiting truly submarine currents for power generation.

The present invention, however, does not depend upon a specific subsea-capable energy conversion methodology or invention, but is able to accommodate a wide variety of such devices in terms of delivery, electrical connectivity, and maintenance. In contrast with the above inventions, the focus of the present invention is therefore not on a new form of discrete device explicitly designed to convert the flow of water into electrical energy, but rather how to practically deliver such devices—in the evolving state of that art which the numerous citations demonstrate—into the submarine ocean current, in a way that is mechanically and electrically practical, sustainable and maintainable, economically produced, non-invasive to surface-based industry or aesthetics, environmentally-sensitive, and on a scale large enough to make a difference in the energy market.

The category of prior art involving submarine "power plants" follows next, which must be addressed in deeper detail for the attributes of the present invention to be best compared and contrasted. Note that the following comparisons are made from the standpoint of practicality for the invention being deployed in a deeper ocean context, for which the present invention is intended, and even though the compared art may not have been so designed. Indeed, many of the following are explicitly or implicitly designed for shallower installation only. However, for the purposes of demonstrating the novelty of the present invention in regards to greater deployment depths, such comparisons must be made from that perspective of application.

U.S. Pat. No. 3,922,012 (Herz, 1975) employs a barge equipped with vertical-axis "turbines." This invention, however, involves a complex system of interconnected shafts, gearing, bearings, and so forth, the maintenance involved seemingly limiting its application to a shallower installation—as seems to be confirmed by the frequent usage of the term "tidal." The invention further appears to be intended for permanent or semi-permanent installation upon the seabed, for no provision is given for freeing it from the ocean floor silt into which it will perhaps sink, or for practically pressurizing (if applied to greater ocean depths) its pontoons. If installed in deeper waters where major ocean currents can be engaged, such a seabed emplacement (with no vertical operational positionability in the water column) would not take advantage of the fact that practical and optimal engagement of said current may occur well above the sea floor. The same can be said of any submarine "power plant" directly deposited on the seabed, in a deeper-water application. The present invention however, while being "barge-like" in appearance and being able to bear a plurality of true turbines, has little or no practical resemblance to the Herz invention. Instead, it is intended for suspended operation in the water column, with vertical and angular means of positioning.

U.S. Pat. No. 4,026,587 (Hultman et al., 1977) represents a power plant based on a single turbine. The device is permanently installed on the seabed and incorporates a pivoting base, underscoring its tidal (as opposed to unidirectional current) application. The assembly is huge enough for diving bells to dock with it, having a hull thick and spacious enough for workers to enter it for maintenance or operational purposes. By contrast, to avoid the inherent matters of human safety in regards to pressure vessels designed for human occupancy, the present invention is unmanned and remotely operable. Further, it is not installed directly on the seabed, and requires no overall mechanical pivot.

U.S. Pat. No. 4,163,905 (Davison, 1979) is similar to the above, involving a pressure vessel into which workers enter, in order to maintain the complex system of endless chain and paddles. Near-surface operation is implicit in the mode of its structural presentation; even so, like Hultman, human safety issues and code requirements in regards to human-occupied pressure vessel design are brought to bear. The present invention, as has been mentioned, avoids such difficulties by virtue of being unmanned (but surface-maintained).

U.S. Pat. No. 4,219,303 (Mouton, Jr. et al., 1980) builds upon the idea of a practical submarine power plant, incorporating an array of tethered turbines being suspended between ocean floor and surface. Mouton's approach for more significant levels of power generation involves, however, the enlargement of the basic turbine, with blades large enough to require annular bearings (that is, without axles). The present invention embraces the same notion of a hydroelectric turbine array. But instead of huge individual turbines, a greater array may be comprised of several submersible platforms as presented herein, each platform bearing a local "array" of comparatively smaller and mechanically simpler energy-conversion devices.

U.S. Pat. No. 4,256,970 (Tomassini, 1981) involves a platform on legs that reach to the seabed. Similarly, U.S. Pat. No. 4,335,319 (Mettersheimer, Jr., 1982) is also leg-supported, and having its prime components (other than impeller) being elevated above the ocean surface. Both are therefore difficult to apply to a deep-water application, as opposed to the present invention which is suspended in the water column, and designed to engage sub-surface currents at greater depths.

U.S. Pat. No. 5,440,176 (Haining, 1995) presents a submarine power plant, with its motive components located on the sea floor. The invention is analogous to that of an "oil platform": a "rig" with legs resting on the ocean floor, but with the supported superstructure being fully submarine as well; and instead of a pipeline, cables reach to shore. The invention focuses however on turbine devices that move up, down and axially relative to their fixed undersea platform, implying a tidal (and thus shallower water) application. If the invention were set in a deeper ocean environment, wherein the purpose was for the engaging of constant-direction current, the need for these directional mechanisms would be obviated. In comparison, the present invention is designed for unidirectional current flow (or practically so), has no such concrete tie to the ocean floor, is suspended at a selectable operating depth (which will often not be optimal near the seafloor), and is designed explicitly for the surfacing of motive components for maintenance.

U.S. Pat. No. 4,306,157 (Wracsaricht, 1981) presents a practical submarine turbine assembly that transmits power to shore. The invention, however, is comprised of a discrete turbine device: statically installed, inherently near-shore, with no provision for its maintenance being readily apparent. If deployed in quantity in a deep ocean environment, such factors could be seen as problematic. The present invention, however, can deliver turbine devices to greater depths, addresses conveyance issues of power thereby generated, and provides for their periodic surfacing for maintenance.

U.S. Pat. No. 4,383,182 (Bowley, 1983) builds upon the hydrodynamic, twin-impeller design of the (river-installed) invention of U.S. Pat. No. 2,501,696 (Souczek, 1950), but with a different motive approach (hydraulic pumping, the pressurized fluid thereby energizing a generator). Both these inventions involve an airplane-like approach to engage the current; both are hard-tethered to the seabed (or, like Souczek, the riverbed). Both have buoyancy-control implications, which are addressed by U.S. Pat. No. 6,091,161 (Dehlsen et al., 2000). Even so, each of these represent a strictly twin-impeller underwater airplane-like device, whereas the present invention can accommodate a larger quantity, and relies on differing means of positional control.

U.S. Pat. No. 4,850,190 (Pitts, 1989) employs an array of tethered equipment, amongst which are buoyant turbines. A surface ship is required, and no technical explanation for disengaging the turbines for maintenance is evident. The purpose of this free-floating network is the generation of hydrogen. The present invention bears an array of turbines mounted to a fixed and retrievable structure, and is focused upon the generation of electrical power as the primary purpose. That being said, the present invention is, by a different selection of payload equipment, equally amenable to hydrogen production.

U.S. Pat. No. 6,531,788 (Robson, 2003) is a tethered device, with active buoyancy control, and therefore a capability of depth variation. It explicitly consists, however, of an arrangement of a single pair of counter-rotating turbine generators, a "streamlined buoyancy tank" that is "torpedo-shaped," and "airfoil-shaped hydrofoils." That is, it is an explicitly twin-generator invention intended for horizontal operation. The Robson invention further claims to be "free of service or replacement for a period of time ranging from about eight to twenty years," such freedom being "accomplished by eliminating moving parts," and using corrosion-resistant materials. Indeed, the device "will not be readily accessible for servicing and repair." Thus, a permanent submerged installation appears to be in view. The invention presented herein, however, can bear many generator units, of various styles, and retrieve them as maintenance schedules require.

Foreign patent WO2005028857 (2004, Perry, et al.) is (or may be) hard-tethered to the seabed; but the composite array of paddles-on-chains represents a single power-generating "turbine" apparatus, does not appear to have means of vertical positionability in the water column, and does not provide for interchangeable turbine devices.

Foreign patent application JP2002127988 (2002, Takemoto) presents a horizontal buoyant frame tethered to the ocean floor into which coaxial series of turbines are installed. The present invention though is designed for a variety of energy-conversion devices individually (as opposed to sequentially/coaxially) presented to the ocean current, for improved mechanical advantage.

US Patent Application 20040189010 (Tharp, published 2004) involves a series of specific forms of perpendicular-axis generator devices mounted to cradles anchored on the seabed, in contrast with the present invention which is intended to be suspended at a distance from the seabed, without relying on a particular type of generator design.

It should be noted that, aside from a review of US and foreign patents, the prior art additionally encompasses various undersea electrical generator systems that are of public knowledge, particularly those under investigation in the UK. The systems researched (as part of the investigation into prior art), however, generally involve a hard mechanical connection to the ocean floor (as opposed to variable tethering) or a basis at the ocean surface (via a floating barge-like structure). Such are therefore fixed and limited in operating depth, and are furthermore specifically tidal in design and application. The present invention, by contrast, addresses a unidirectional (or practically so) ocean current, engaged in areas wherein ocean floor depths tend to preclude the aforementioned approaches by virtue of their design.

A final group of prior art for consideration is that of submarine systems that have nothing to do with power generation, but which have relevance in view of the multi-purpose means of submarine delivery afforded by the present invention. U.S. Pat. No. 3,220,372 (Lehmann, 1965) is a submersible barge that directly comes to rest on a base frame installed on the seabed, something not involved in the present invention. A similar purpose and approach can be seen in U.S. Pat. No. 4,860,681 (Svenning, 1989), though in a much more elaborate manner. U.S. Pat. No. 3,293,867 (Dean, 1966) presents a means of reestablishing mechanical contact with an undersea wellhead, and indeed involves a buoyant platform with powered take-up winches. The present invention, however, does not have the ocean floor as its operational destination.

U.S. Pat. No. 3,626,703 (Richburg, 1971) includes an arrangement of buoys and moorings, intended to guide a submarine vehicle in its operations. However, it operates exclusively from a surface ship. U.S. Pat. No. 4,278,362 (Scherrer, 1981) is designed to repeatedly retrieve and re-deploy a submarine device by tethered and buoyant means; it relies, however, on a specialized receptacle on the ocean floor to receive the submergible object, and a seabed position of device operations. U.S. Pat. No. 4,557,697 (Kontar et al., 1985) has similar purposes; but the invention relies entirely on variable buoyancy for depth control.

Numerous other submarine systems and inventions (that do not focus on undersea power generation) might be cited, in that one element or another might be seen to be analogous in a particular aspect of the present invention. But like those examples that are cited, none have the purposes of the present invention for electrical power generation, nor the same approach to achieving the delivery and retrieval of primary equipment involved. Likewise, much more could have been said concerning the discrete devices surveyed that do indeed have submarine current-motivated power generation as their objective. Yet the present invention does not focus on explicit energy-conversion inventions (or pairs of such), but on a practical means of presenting an array of such devices to subsurface ocean currents in the water column, and retrieving the same for maintenance.

BRIEF SUMMARY OF THE INVENTION

The invention centers on a submersible platform comprised of a substantially open and payload-carrying transverse structure, a combination of buoyant volumes that are either static or variable in displacement, communications and control equipment, mooring lines and associated winch assemblies, and a means of conveying converted energy to an off-board facility or consumer. Upon the platform are mounted one or more payload devices that convert the kinetic energy of ocean current to a transmissible or transportable form.

Though all components and subsystems are founded on proven technologies, the novelty in the invention arises primarily from the combination and application of such technologies, the arrangement and design of the system and its major components, and the means by which the platform, with its payload, is deployed, retrieved and presented to a submarine current between such operations.

In the operational mode, the platform is suspended (that is, between ocean floor and surface) in the water column, in an attitude ranging from vertical to horizontal. The platform is restrained by mooring lines that are themselves anchored to the seabed, with the platform itself remaining positively buoyant enough to keep such lines taut and its position thus fixed. The free end of each mooring line assembly is preferably retained at the surface by specialized buoys, while the anchored end may be at a great depth. Between anchor point and maximum-depth operational position, the mooring lines are preferably affixed with flotation devices, allowing the burden borne by the buoys to be only that of the length of mooring line between the surface and said maximum operational depth. The anchoring technologies relied upon are essentially those typically employed for offshore oil platforms.

A key element of the platform is in its means of controlled descent and ascent, that is, its on-board winch system. In concert with buoyancy control of the overall platform, this system enables the platform to "crawl" down its mooring lines from the surface, and to likewise ascend (assisted by variable buoyancy) for maintenance or other purposes. The winches may be of a "take-up" design (e.g., a drum reeling a cable thereon); the preferred embodiment, however, employs (in the region of operational descent) chains that are readily engaged for tractive purposes, thereby obviating the need for take-up drums or other on-board holding facilities, and precluding any added mass onboard the platform assembly.

In regards to deployment, the fully buoyant platform is first towed at surface into position (i.e., amongst or near the mooring line buoys). Alternatively, the platform may be self-powered for surface transit, though such is not the case in the preferred embodiment (wherein sensitive mechanisms are intended to be kept to a minimum). With the platform still at the surface, the mooring lines are retrieved and threaded into or onto the winch assemblies, and any required electrical cables—likewise kept at surface via one or more buoys, in absence of the platform—are attached. Once all is secured, and upon remote command, certain ballast tanks are (in controlled fashion) flooded so as to produce the appropriately reduced displacement, as the winch assemblies begin pulling the platform down to its preferred operating depth. Retrieval is essentially the reverse of this operation.

Power management and conveyance, and control from either surface or shore facilities, are elements just as important as those described above. Noting that direct transmission of electrical power to a shore facility is implicit in the preferred embodiment, all connections between seafloor cables and the platform are preferably made at the surface, obviating the need of adjunct submarine (e.g., remotely operated) vehicular activity. Prior to and between deployments, cable terminations are preferably retained at the surface by one or more specialized buoys, with the cables being themselves made slightly positive in buoyancy to reduce the load thereon. Once connected to the platform, cables are "dragged" down with the platform, and (by action of the ocean current) trail freely behind it, arcing down to their associated anchors and junctions on the seabed. Note that the subsea cabling technologies relied upon for the present invention are substantially the same as those currently employed for seabed power and telecommunications conductors and their installation.

Control signal is provided by one or more means, such being able to act exclusively or redundantly. A first means is via the same power cable(s) proceeding to a shore-based facility, whether via dedicated conductors or electronically multiplexed upon the power conductor(s). A second means is via the tether retaining a designated buoy, such signals being wirelessly transmitted from this buoy to an operator console either shore-based or ship-board. A third means involves the same dedicated and communicating buoy, with communications between such and the platform being by underwater wireless (acoustic transpondence) means. In whatever order of prominence, such communications avenues provides for a primary, secondary, and perhaps tertiary means of monitoring and control of the platform and its payload devices by a remote facility.

In the preferred embodiment, the presence of substantially uni-directional ocean current is taken advantage of, to trail any buoyant cable(s) behind the platform to which they are connected, and to maintain adequate separation between mooring lines and any cable-retentive buoys (by means of properly oriented fins affixed to the buoys), thus keeping all lines and cables from entanglement. Said current further serves to fix the platform in operating position, by virtue of its forces being reacted by the platform's mooring lines.

The invention presented herein may be of inseparable construction. The preferred embodiment, however, employs a modular approach for reasons of manufacturability, maintenance, upgradeability, and expandability, in its various respects. Thus the system is applicable to a broad variety of modes and means of undersea current-based energy conversion devices, and the presentation thereof to a submarine current.

BRIEF DESCRIPTION OF THE SEVERAL VIEWS OF THE DRAWINGS

FIG. 3 is an isometric view (from a position 90 degrees to that of FIG. 1), showing only those elements pertaining to an example of electrical cabling.

FIG. 17 is an extension of FIG. 16, with the platform undergoing either deployment or extraction operations in this exemplary application.

FIG. 18 is a companion schematic diagram to FIGS. 16 and 17, showing the subsea site prepared to accept the submersible platform.

DETAILED DESCRIPTION OF THE INVENTION

Figure 1:
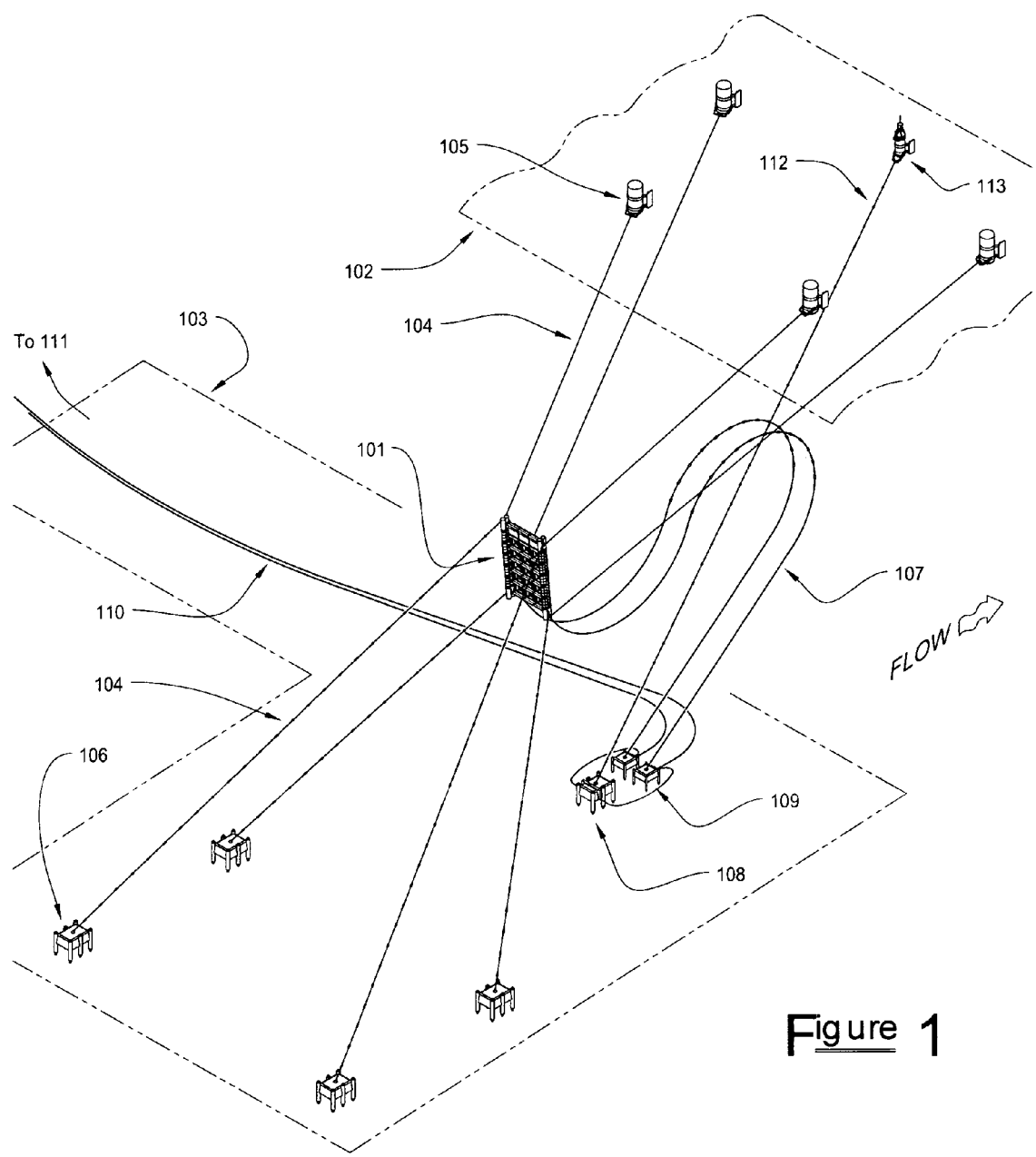
FIG. 1 is an isometric view of the submersible platform and its associated elements, in an exemplary operational arrangement within the water column.

Referring first to FIG. 1 the overall invention, involving the submersible platform 101 proper and its adjunct equipment, is depicted in a preferred embodiment and exemplary operational deployment. The platform is shown suspended in the water column, that is, between the ocean surface 102 and floor 103. The platform is retained against and normal to the flow of ocean current by means of flexible tension members (i.e., mooring lines) 104. The free end of each said mooring line is shown retained at the surface by means of a mooring line buoy 105, with the fixed end secured to the ocean floor by means of an anchor 106. The platform resides at a predetermined operational depth and angular attitude, in relationship to the ocean current, such depth and attitude having been selected for reasons of optimal current engagement, adequate distance from surface turbulence, proximity to any further application-specific ancillary equipment (not illustrated) on the seabed, etc. Having its winches engaged with the mooring lines while at the ocean surface, the variably-buoyant platform reaches operational depth by "pulling itself" downward along said lines.

The remaining features pointed out in this figure relate to electrical cabling, beginning with one or more power cables 107. Having likewise been connected to the platform while at surface, such cables are secured at their lower end to anchor assemblies 109 on the seabed. Electrical power generated by devices mounted to the platform is conveyed thence by sea floor cables 110, ultimately reaching a shore-based facility 111 (or application-specific ancillary submarine equipment, not illustrated) for distribution and consumption. A final anchor 108 is depicted, serving the purpose of retaining a surface cable management buoy 113 by means of a tether 112. Said tether keeps its buoy at station in all stages of platform deployment and operation, said buoy having the purpose of holding the free ends of power cables 107 at the surface when not attached to the platform. Said tether optionally, and additionally, conveys electrical signal to the buoy 113 from the platform, such signal having reached the tether terminus at anchor 108 via an electrical connection with cable anchor assemblies 109 and thence power cables 107. Note that while these anchors are shown as separate, it should be understood that they may be readily embraced within a single unitary assembly.

FIG. 2A displays the same arrangement as FIG. 1 in elevational side view, and is useful for explaining the preferred mooring line system in greater detail. Mooring lines 104, associated buoys 105 and anchors 106 are again shown, with the submersible platform 101 at a predetermined operational depth between the surface 102 and floor 103 of the ocean. With the direction of current flow being left-to-right in the figure, and the buoyancy of platform 101 and buoys 105 in mind, the behavior of the mooring lines 104 is self-evident within the two dimensions of this figure.

Figure 2:
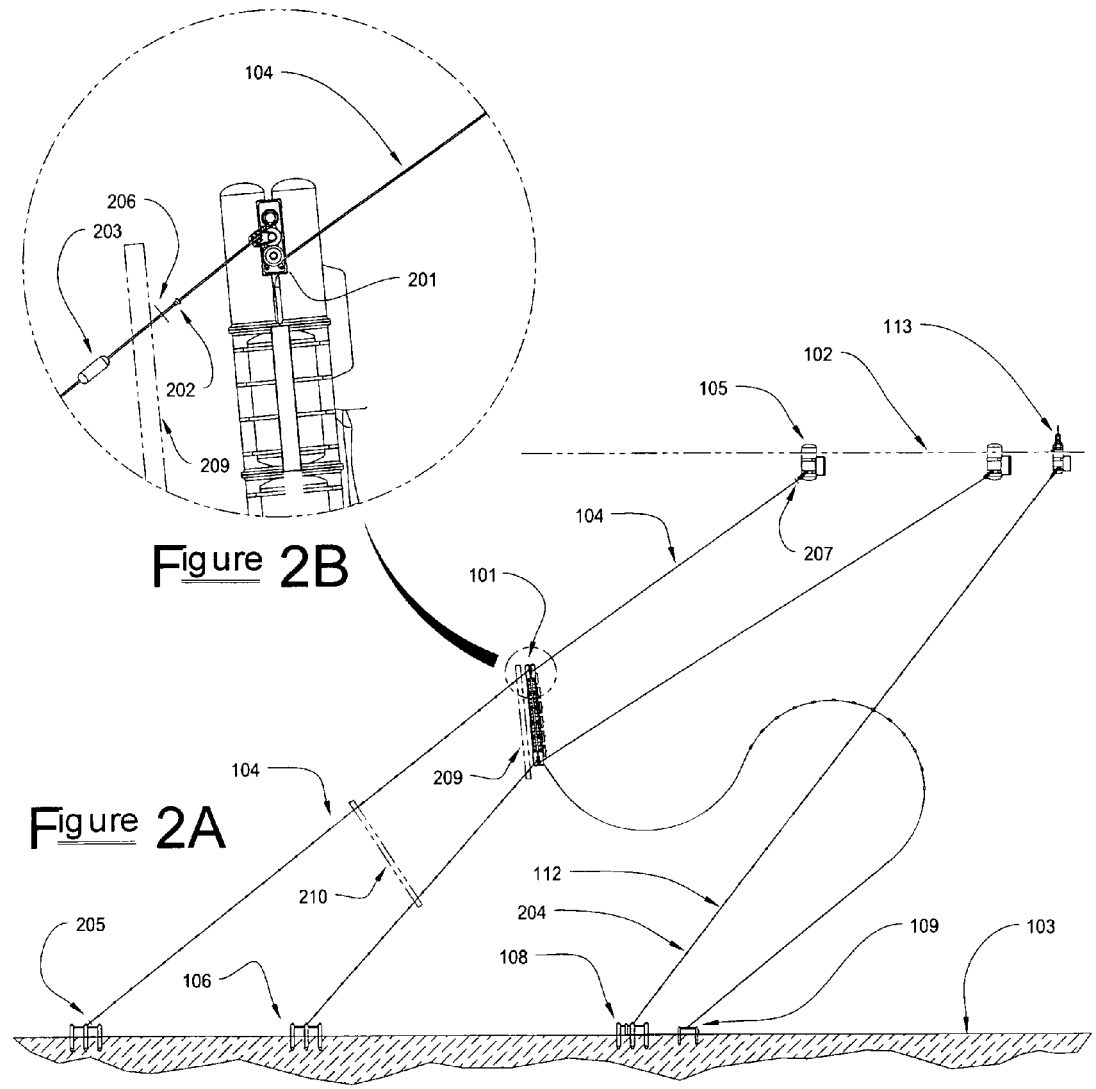
FIG. 2A is a side elevational view of the same, with emphasis placed on the mooring line system, FIG. 2B being an enlargement of an area of the platform showing the engagement of one mooring line (or set of such) with an associated winch assembly.

Note that when the term "longitudinal" is used below, such generally refers to arrangements or actions that are parallel to the submarine ocean current and the centerline of both platform and anchorage equipment. The term "transverse" will similarly refer to a direction perpendicular to that just described. Finally, the term "attitude" will generally refer to the angle of the platform assembly, relative to the horizontal plane. Thus, for example, FIG. 2 is a longitudinal elevation, with the plane of the platform assembly lying transverse to current flow and being positioned at a nearly vertical "attitude."

Referring to detail FIG. 2B, from the anchor point 106 to the platform's winch assemblies 201 (i.e., to a pre-determined maximum depth position along the length of each mooring line 104), said lines are held taut by both the buoyancy of the platform and the action of current forces upon it. This maximum depth position is preferably identified with a mechanically down-stop assembly 202 affixed to the mooring line, which stop assembly triggers a sensor located on the associated winch assembly and preventing further excursion of the platform downward. This stop assembly is a standby means of such prevention (the primary means being depth sensors contained within the platform assembly itself), and should not normally be encountered by the platform's winch assemblies.

Said down-stop assembly 202 is indicated as an individual device affixed to each cable. However, it should be evident that, especially with greater ocean floor depths, these down-stops might be incorporated into a larger framework 209 that further maintains dimensional separation between said down-stops. Such a framework, along with any supplemental line-separating frames 210, are preferably equipped with buoyant volumes, and serve the purpose of lower mooring line segregation as perhaps mandated by greater ocean floor depths.

From the platform's winch assemblies 201 upward to the mooring line buoys 105 the remainder of the mooring line is likewise kept comparatively taut, due to the buoyancy of said buoy and action of ocean current acting upon it. Because of winch engagement thereon, this upper segment of mooring line between maximum operational position and buoy must be free of any adjunct buoyancy features, and the buoy 105 therefore must be of sufficient displacement to carry the weight of said segment. From the point of maximum depth down to the anchor 106, however, no travel of platform is permissible; thus adjunct flotation devices 203 are affixed to the mooring line 104 between those positions. Said flotation devices render the lower portion of the mooring line as neutrally (or, slightly, positively) buoyant, thus minimizing the burden borne by the buoy 105, and allowing emplacement of the submersible platform in geographic regions where the ocean floor is at a depth significantly greater than maximum operational depth. By means of the above described features, it should the evident that the present invention may be deployed in regions where the ocean floor is indeed at a great depth indeed, in comparison with the maximum selected operational depth. This is a significant point, in that adequate engagement of ocean currents may often transpire in the upper levels of the water column.

Figure 5:
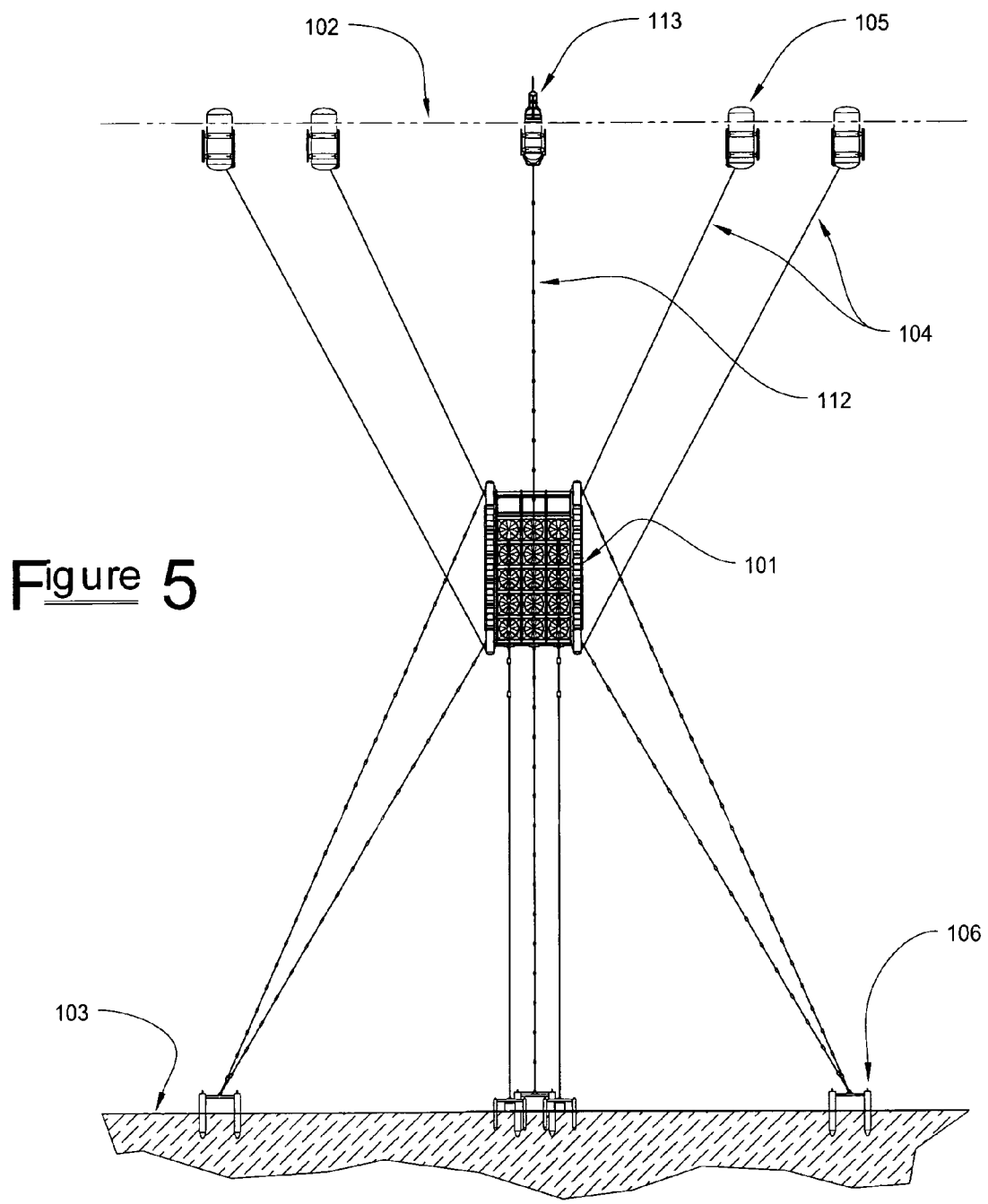
FIG. 5 is a longitudinal elevational view of an exemplary operational configuration.

While transverse motion (relative to the view represented by FIG. 2) of the buoys will be addressed in the discussion of FIG. 5, additional features involved with related vertical and longitudinal behavior are more evident in this view. The mooring line 104 is portrayed as attached to its associated buoy 105 by means of a yoke, with the buoy itself having one or more fins attached thereto (see FIG. 11), such features intended to preclude mooring line entanglement. As described below, surface currents acting upon the said buoy and fins tend to orient said buoys down-current of the deployment site. Longitudinal separation is enhanced here by virtue of the down-current mooring lines being longer than the up-current lines. This separation is reinforced not only by the afore-mentioned frames 209 and 210, but also by placement of the associated anchors into up-current and down-current transverse pairs, ensuring non-entanglement even when the submersible platform 101 is not yet engaged.

The attachment yokes on the mooring line buoys facilitate prevention of twisting in mooring lines, by virtue of the inherent arrangement maintained by the forces of ocean current. That is, because of the buoy's fins and down-current position, and in view of the tension maintained at all times in the mooring line, the likelihood of any spinning of the buoy relative to the axis of its associated mooring line is low. However, the relief of any remaining twist in said line (e.g., twist already present when the lines are first installed and their upper ends are first terminated at the buoy's yoke) may be achieved via optionally installed swivels, located at positions 205, 206, and/or 207. Such swivels are standard devices employed to relieve twist in a submarine mooring line. Depending on the depths involved (and other application-specific factors), one or more of these swivel positions may be obviated, or added to.

The retention and behavior of the cable management buoy 113 is much the same as for the mooring line buoys. Fitted with analogous fins and a termination yoke (see FIG. 10), said buoy is held at station by means of a tension member (i.e., tether) 112 that is preferably terminated at its lower extremity to the ocean floor via its own anchor 108. Not involved with platform winch engagement, the entire length of this tether is kept at neutral or slightly positive buoyancy by means of flotation devices 204 affixed to it. Twist prevention is aided by the aforementioned fins and yoke, acting in concert with ocean current forces; twist alleviation is optionally achieved by one or more swivels installed along the tension member, though such is not as necessary as with the mooring lines.

The tension members involved for both mooring lines and cable buoy tether, and the means of securing such to the ocean floor 103, involve technologies standard for the offshore oil industry, and the depiction of these features in the presented drawings should not be construed as being limiting of the actual products or approaches selected for the purpose. Likewise, the buoys involved should be considered as diagrammatic in depiction, with the details of their illustration being presented as but one approach to the individual demands being accommodated.

Turning next to FIG. 3, wherein the major electrical cables of the preferred embodiment of the overall invention are emphasized. The submersible platform 101 is outfitted with one or more electrical power connectors 301, to which are attached one or more power cables 107. Note that while the primary purposes of power transmission are conveyed by the terms "power cable" and "power connection," it is evident that signal conductors may also be resident in said cable(s). Further, said "cable" may be a single cable of one or more conductors and of unitary fabrication, or an "umbilical" of bundled individual cables.

Such electrical connections to the platform are made, in the preferred embodiment, while the platform is still at the surface, thus minimizing or eliminating the involvement of underwater "mating" operations (e.g., performed by a remotely-operated vehicle) in the deployment process or its reverse. However, in an application in which a trailing power cable would be undesirable, the invention is of course readily adaptable to remote (underwater) "making" and "breaking" of the electrical connections involved, by means of said remotely-operated vehicles. Regardless, the connection 301 is optionally equipped with a remotely actuatable means of mechanical disconnection from the platform 101, e.g., for instances of emergency surfacing of the platform assembly proper. Such mechanical disconnection may involve a kinematic mechanism, explosive bolts, or a simple means of cable tension equating to breakaway tension.

The power cable is kept positively buoyant throughout its length by means of affixed flotation devices 302, though not with so much buoyancy as to impart any serious load to the platform connection 301. Said flotation devices are sized and arranged along the length of the cable in view of cable weight per lineal length, current, operational depth, and intended behavior of the cable for a certain site and application. The arrangement depicted for these devices is, therefore, merely illustrative in nature, but reinforcing of the concept of the cable's training behind (that is, down-current) of the platform in its operational position, via the action of surrounding current.

Depending primarily on application-specific depths involved and mode of deployment, the terminations of cable 107 are optionally equipped with mechanical swivels and/or strain-reliefs, suitable in design for submarine operation. Most importantly, the connection 301 at the platform end may see a great range of angular approach of the cable relative to the platform, as the platform moves between surface and operational positions (and vice versa). Thus it is anticipated that a vertically pivotable electrical apparatus be installed in conjunction with said connector 301 (see FIG. 9). As for the lower extremity, a similar device may be optionally installed; the selection of which, however, depends upon the depth of the ocean floor at a particular site, behavior of cable in all the platform's positions, and thus the likelihood of any serious change of cable angle relative to its anchor 109.

Twist alleviation of power cables is not anticipated to be of concern, though an axial slip-ring device 306 may be readily installed in the cable (or incorporated into swivel assembly 303) should the characteristics of a particular deployment necessitate such. See FIG. 10 for further discussion on the matter of twist prevention.

After reaching cable anchor 109, the power cable encounters an optional electrical junction 304, which provides for the break-out of signal conductor cable 305 while facilitating electrical connection to the main seabed cable 110. Said main seabed cable proceeds (in the preferred application) along the ocean floor, conveying power to a shore-based facility 111. Laying of this cable is a part of the initial site preparation (involving anchor setting, mooring line setup, securing of buoys, etc.), employing techniques typical for the submarine cable-laying industry.

As with the platform-connected power cable 107, that of 110 may contain dedicated signal conductors, appropriately shielded from interference of proximate electrical power being transmitted. Alternatively, signal for both cables may be electronically overlaid upon the selfsame power conductors, using standard technologies of multiplexing and decoding at either end. In this latter approach, the junction 304 could be readily equipped for the further purpose of such multiplexing and decoding of signal, and bi-directionally communicating such via signal cable 305.

Regardless, signal cable 305 preferably connects to tether 112 of the cable buoy 113 (not shown in this figure), having electrical contact with such tether within the boundary of the tether anchor assembly 106. As there are a variety of approaches in all the described signal conveyance, as the state of that art continues to evolve, and as the present invention is not dependant upon any particular such technologies of signal communication, details in this regard need not be elaborated upon. Indeed, with the steady improvement of underwater wireless communication (e.g., acoustic signal transpondence) methods, any "hard wired" approach may be obviated in entirety without affecting the nature or novelty of the present invention. In such a case (that is, if and when acoustic transpondence for signal communication is preferred as the primary means of communication for a particular application), signal cable 305 might be eliminated, along with signal transmission along cable buoy tether 112. Instead, the cable buoy 113 and platform 101 could both be equipped with acoustically transponding devices, and thus be in constant wireless (though through-water) communication (see FIGS. 13-18).

Note that all elements mentioned above for electrical power and signal handling are founded on existing technologies. Note also that while only one cable is shown proceeding from the platform in FIG. 3, a plurality of such (two, three, or more) may be involved, depending on how much electrical energy is involved (e.g., how many turbines are installed on the platform, and of what generative capacity), size of cable conductors, etc.

Figure 4A:
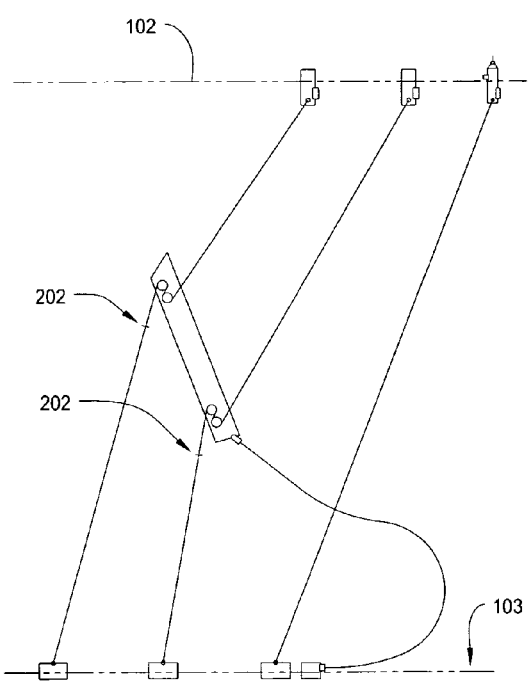
FIG. 4 contains three diagrams depicting positional platform states, with FIG. 4A representing an operational configuration.
FIG. 4B representing engagement of the platform to its mooring lines and cable(s) while on the ocean surface.
FIG. 4C representing a site prepared for, and ready to accept, the submersible platform.

Referring next to FIG. 4, which serves as a diagrammatic review of basic positional states for submersible platform 101. FIG. 4A depicts an operational position between ocean surface 102 and floor 103, with maximum depth for platform excursion being ensured by stop assemblies 202 (and optionally frame 209, not shown) as described above. Note that the operational attitude of the platform should be understood to be application-determined, with a vertical (or near vertical) attitude being appropriate for the axially arranged hydroelectric turbines depicted for the preferred embodiment. For a payload of vertical-axis turbines, where applications of the platform are of mixed-use nature, etc., the operational attitude could be just as easily a horizontal one. Note also that even when normally in a vertical operational mode, the platform can be remotely commanded to a horizontal (or any angle in between that and vertical), should such a position be necessitated in view of weather-induced severity of subsea current or turbulence.

Figure 4B:
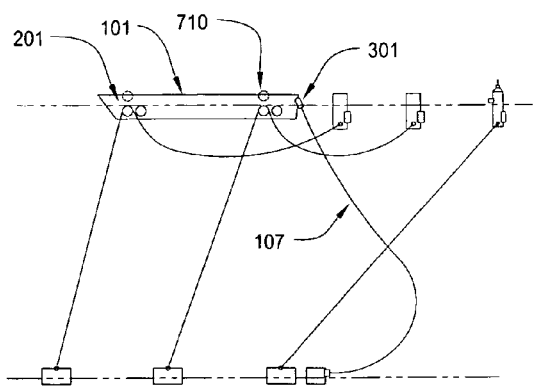

FIG. 4B portrays platform 101 in a surface position, either in preparation for submersion to an operational state (in the subsequent releasing of the platform, e.g., for transport to shore for maintenance purposes, the process is the reverse of that described). The mooring lines 104 have been lifted out of the water 102 and threaded onto winch assemblies 201. During such threading operations, an idler wheel and arm 710 has been lifted away (such wheel being discussed further in the context of FIG. 7). Once the mooring line is so engaged, this idler wheel mechanism is again lowered to and locked in an operational position, and serves the purpose of retaining proper wrap of the mooring line around the winch drum as the platform descends and changes in attitude.

A power cable 107 has been mechanically disconnected from the cable management buoy 113, and mechanically and electrically connected to termination 301 mounted on the platform. Note the great angular difference of the cable relative to the platform, by comparing FIG. 4A with FIG. 4B, such difference necessitating the platform-end swivel described above (see also FIG. 9).

Figure 4C:
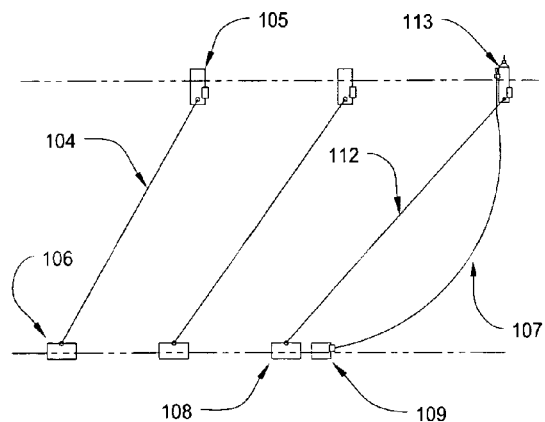

FIG. 4C diagrams the major site-installed components of the preferred embodiment, but in the absence of platform 101 (either prior to or between its deployments). Within the context of this figure, it is worth describing the basic means of how the site is prepared. Note that such a description is subject to improvements in the adjunct arts, is achievable by a number of means in its details, and is therefore merely presented as exemplary of practicability. Working from the shore, by means of standard cable-laying technologies, one or more shore-based power cables are laid upon the seabed to a predetermined site. Whether using a single vessel or multiple ones, and by either surface operations only or a mixture of surface and submarine, the seabed cable is mechanically secured to its anchor 109, which has been or is subsequently lowered and set by standard (e.g., "suction pile") methodologies. Perhaps as part of the same operation (indeed, the anchor assemblies may be of integral design and shared construction), the anchor 108 for the cable management buoy tether 112 is likewise lowered and set. However secured to its anchor, however, the termination of the shore-based (seabed) cable includes the attachment of the floating portion upper cable 112 (i.e., that to be attached to the platform), including any break-out of signal cable at this point. Alternatively, the seabed cable may be the selfsame cable that proceeds to the surface, but is simply affixed with an anchor connection point or collar, without any disruption to connectivity. Regardless, the upper cable 112 is affixed with flotation devices prior to the lowering of the seabed cable anchor connection. The free end of cable 112 is finally terminated with the electrical connector device that mates with its counterpart on the platform, such device being then positioned on specialized brackets residing on cable management buoy 113.

Whether before, after, or in concert with the above activities, the mooring line anchors are lowered and set, with the free ends of the ignoring lines being retained at surface. Upon determination of proper slack (e.g., in view of buoy behavior in the currents and with the depths involved), the mooring lines are terminated to the yokes of their associated buoys, and the latter are set adrift. Depending on calculated depths, weights and forces, each mooring line 104, tether 112, and cable 107 has appropriate flotation devices attached prior to lowering (e.g., prior to the lowering of its associated anchor or anchor connection). Additionally, mooring lines have their maximum depth stop assemblies 202 and/or frames 209/210 affixed as part of this procedure.

Additional site preparations for localized subsea applications are, of course, determined by their situation and application. That aside, the above description exemplifies a typical site preparation, involving components and procedures that are currently available, and proven in their adequacy for the purposes of the present invention. Into a site so prepared is towed the submersible platform, which is then set amidst and up-current of the buoys involved, and engaged and deployed as described in the foregoing.

This is a proper context to address as well the servicing of the submersible platform 101, such servicing requiring at a minimum the surfacing of said platform as depicted in FIG. 4B. Minor repairs or periodic maintenance may be performed while on the surface and still at station, by a vessel perhaps specially outfitted for the task. Alternatively, or for major repairs or upgrades in payload or other equipment, the platform may be disconnected from its mooring lines and cables and towed to a shore-based support facility. Regardless, the surface-servicing vessel may be specialized in design for the purposes in view, and perhaps envelop the platform (e.g., being catamaran in design) in the engagement of it. The service vessel and the towing vessel may further be comprised in the same entity, such a specialized vessel being available to deploy, service, and bring to shore one of an array of submersible platforms deployed in a greater and aggregate arrangement.

FIG. 5 depicts a longitudinal elevational view of a typical installation of FIG. 1 (from a down-current position), and serves to reinforce discussion on the vital matter of line entanglement prevention. Longitudinal separation of anchors and (via tension member length) buoys has been addressed above. Transverse separation is underscored, and for the same reasons, via the present figure. How this transverse separation is accomplished is addressed below, and also in the discussion of FIG. 10 and FIG. 11.

In the operational condition, ocean current forces acting upon the platform 101 provide sufficient tension to the lower portion of mooring lines so as to prevent any entanglement thereof, in view of anchor separation and the optional presence of frames 209/210. Note that such optional frame or frames may, with increasing ocean floor depth, be of increasing size and therefore dimensional spread of mooring line anchor points for the purposes of stability. Note also that, depending on depth and variation of current directionality in regions below maximum operational depth, further tensile members (not illustrated) may be required to prevent rotation of said frame or frames. Note finally that though the preferred embodiment illustrates a tensile anchorage approach, a structural one (pedestal, tower, etc.) may be more appropriate for a particular site condition.

Regardless of submarine mooring to the point of maximum depth excursion of the platform assembly, its mooring lines— up to the point of winch engagement—is under tension, and, by a variety of means, made dimensionally stable and preclusive of line entanglement. In the upper and winch-engageable segment of said mooring lines, specifically that between winch and surface buoy, the transverse spreading of such is equally vital for the purpose of non-entanglement. Depicted is a transversely spread arrangement of buoys retaining such lines at their upper extremity, with current flow being toward the viewer of this figure. The cable management buoy has fins that are (in plan view) perpendicular to the axis of its tether yoke and parallel with (surface) aquatic current, keeping it centered. The mooring line buoys, however, have fins oriented (in plan view) at an angle not parallel with the mooring line axis and yoke termination. In the absence of such fins or angular difference, the mooring line buoys would be vectored directly down-current from their associated winch assemblies. Given the transverse distance (port vs. starboard) of such assemblies, and in view of the operational depth involved for the platform, such free-floating buoys at the surface could well see their lines entangled. With the addition of angled fins however (in conjunction with the termination yoke), the current vectors said buoys away from the centerline of surface current flow, to one side or the other. Given a right hand and left hand orientation of said fins, the buoys on the port side are vectored transversely to port, and the buoys on the starboard side of the platform to starboard (see FIGS. 10 and 11 for further discussion).

In conjunction with longitudinal spacing of anchors, fore vs. aft mooring line lengths, centering of the cable management buoy in between, and vectoring fins on mooring line buoys, all lines and cables of the present invention are separated longitudinally and transversely, both below and above the platform in all its operational states.

Figures 6A, 6B:
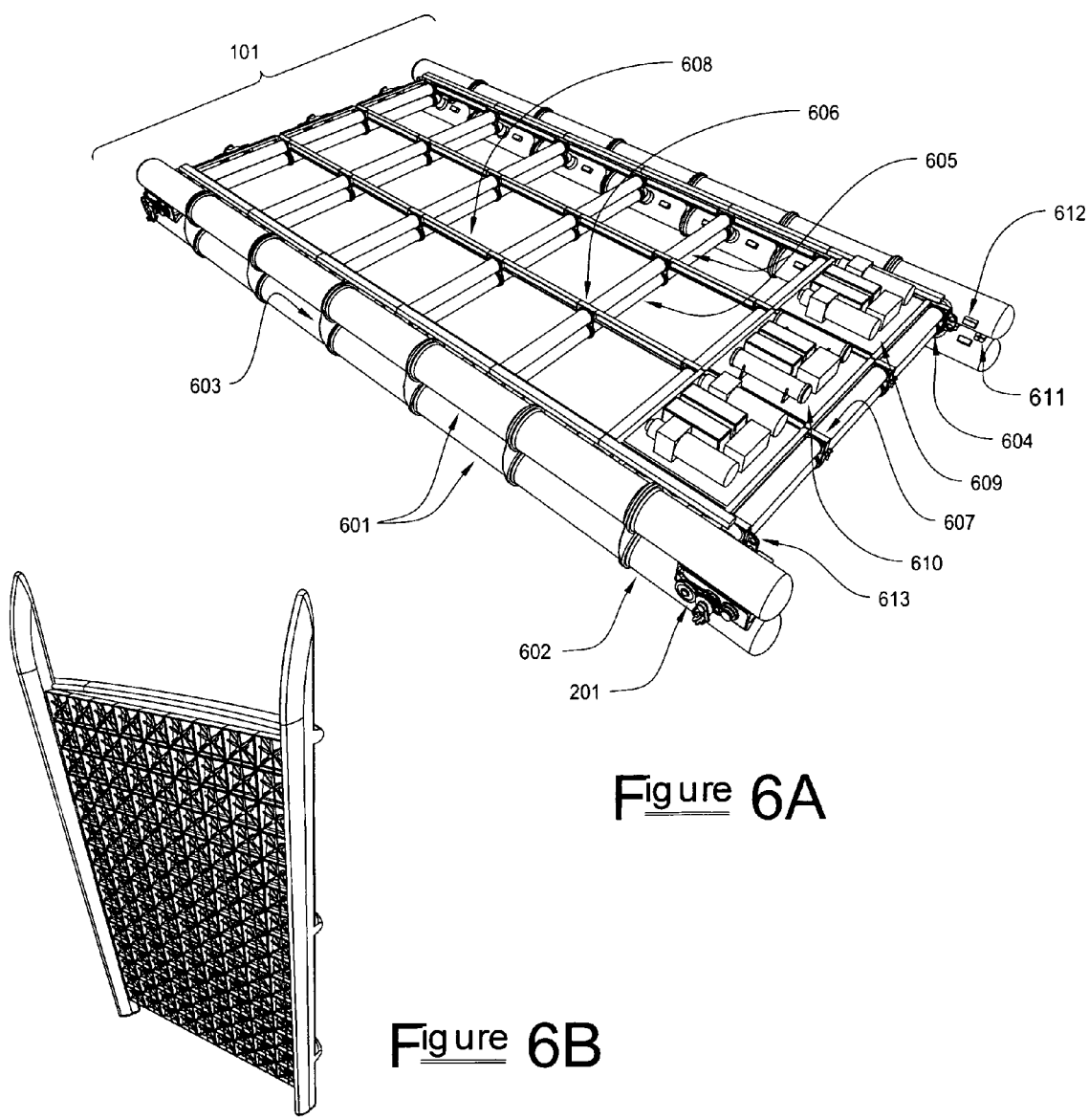
FIG. 6A presents a perspective isometric view of the preferred embodiment of the platform assembly without any payload (e.g., without electrical generating devices), showing its primary structural and functional members.
FIG. 6B shows a more artistic conception of a non-modular, and larger-scale, application of the present invention.

FIG. 6A represents a perspective isometric view of the submersible platform 101 in a preferred embodiment, absent of payload devices (e.g., hydroelectric turbines) and with a focus on structure and generic functionality of the submersible platform as such.

Two pontoon assemblies are illustrated, each consisting of upper and lower buoyancy volumes 601, the fore and aft-most of which being designated by 602, with the upper and lower of all such volumes each being connected with members 603. The necessity for verticality in the cross-section of these composite pontoon volumes is apparent in modes of surface transport of the platform, wherein the center of buoyancy is preferred to be such that payload equipment is elevated above surface drag and wave action. The division of upper vs. lower tanks in the presented design is thus illustrative, and may as well be accomplished by a unitary approach in hull or hull segment design. But for purposes of simplicity in manufacture, the preferred embodiment incorporates such a upper/lower tank configuration, due to the fact that commercially available pressure vessel components are more readily available for round cross-sectional volumes than for obround.

The pontoon assemblies of 601, 602, and 603 are depicted in an exemplary fashion, though segmentation and configuration are subject to the scale of the overall platform 101 assembly, the payloads involved, ocean surface conditions in deployment areas of interest, and so forth. Thus the pontoon assemblies might consist of one row of buoyancy volumes 601, or two vertically-positioned rows as shown, or more than two vertical rows. Moreover, an alternate embodiment a completely different arrangement of buoyant volumes with respect to the transverse payload-bearing structure. Regardless, in the preferred embodiment, the purpose of member 603 is to structurally tie the vertical cells of buoyancy volumes, and at the same time structurally relate the same to the transverse payload-bearing structure.

It should be readily understood by those conversant in the art that the pontoons may be of inseparable/unitary construction, or modular. A depiction of the former is shown in FIG. 6B; however, the latter is favored in the preferred embodiment, in that the platform's dimensions are intended to be expandable without major redesign, with its basic structural components being more readily "mass-produced." Indeed, an optimal configuration of the invention might well proceed toward the more artistic depiction of FIG. 6B; but until that configuration is empirically discovered, flexibility (and modularity in construction) is of evident benefit.

The point should further be raised that though the preferred configuration presented has two pontoons that are (with the platform operationally deployed) parallel with ocean current flow, other configurations of such may be conceived of, or indeed demanded, by virtue of a particular application. Three pontoons (for example) with a corresponding trio of mooring lines and winch assemblies, or an upper and lower pair of pontoons perpendicular to the current, can be readily envisioned. The present invention should be seen as encompassing of such configurations, without a constriction of the essential elements thereof.

Regardless of finally applied configuration, the buoyant volumes 601 and 602 can be readily understood as cellular in nature, in terms of their pressure (and perhaps mechanically separable) boundaries. As with any submarine vehicle, pressure segregation of such volumes is critical. Certain buoyant cells are statically preclusive of water entry, while others are individually capable of flooding or evacuating (that is, "blowing" of entrained water), depending on the application. Such submarine ballast systems are well known, and need not be addressed in detail herein. In terms of cellular boundaries however, it should be pointed out that the volumes represented by volumes 601 may be open-ended, with members 603 comprising both a structurally connective element and, simultaneously, a pressure boundary between such cells (as in a blind flange), having seals and sealing surfaces appropriate for the purpose. Alternatively, the tubular buoyant volumes 601/602 themselves may have internal pressure boundaries (e.g., integral end heads), rendering the connective members 603 as performing a strictly a structurally connective purpose.

Proceeding with the preferred embodiment, the transverse connection between pontoon assemblies arises next. In keeping with a preferred modular approach, such transverse members are comprised of structural tubes 605 that interconnect said pontoon assemblies by means of flanged connections 604. In a unitary hull approach (as exemplified in FIG. 6B) such flanged connections might be obviated, but are retained in the preferred embodiment for reasons enumerated above. An upper and lower set of such transverse assemblies is depicted, joined by connective members 608 and 607 (analogous to those of 603, though smaller in scale). Such joining members 607/608 may be pressure-retentive (as in a sealed flange) for transverse tubular volumes 605; or said tubes may be provided with integral pressure boundaries. The transverse members may furthermore serve as either passive (permanently sealed) or active (ballast tank) components of the overall buoyancy systems of the platform. Mounted to the outboard forward members 607 are illustrated tow points 613 utilized in surface transit, though such functions may be variously located.

Incorporated into the volumetric structure described above is the transverse payload-bearing structure. In the preferred embodiment, such is provided by means of simple open-section beam members 608, mounted between and to connective members 606 and 607, the difference between the two being in their design for fore/aft placement (607), or in-between (606). The open cross section of these members 608 is readily adaptable to any number of payload assemblies, leaving the pressure-retentive (or exclusive) nature of components 601, 602, and 605 undisturbed in any such adaptation. Note that a payload assembly need not be constrained by the envelope of one dimensional "cell" formed by such members 608 and 605, but may encompass the "footprint" of several such "cells."

The fore and aft-most pontoon cells 602 have been singled out as significant, for both functional and structural reasons. These are, in the preferred embodiment, intended to carry the load of the winch assemblies 201, and therefore any loads imparted by them to the platform structure by means of their interaction with mooring lines (with ocean currents acting upon the platform as a whole in view). The vertical pair of volumes 602 will therefore likely of necessity be of inseparable design, with saddles 611 serving as a structural bond between upper and lower cells, and at the same time providing a structural interface upon which the winch assemblies 201 may be mounted. Further, these fore (and possibly aft) cells of the pontoons are optionally of greater capability of pressure retention (e.g., having additional internal stiffeners, thicker hulls or carbon fiber reinforcement), serving as containers of air pressurized to a comparatively higher pressure, such being a backup means of emergency ballast "blowing" (see below discussion of FIG. 8).

All active (as opposed to passive) pressurizable cells in the structure (fore and aft pontoon cells, intermediate pontoon cells, and—optionally—transverse tubular members) are equipped with appropriate penetrators and valves 612, whereby standard methodologies for ballast systems act upon said volumes to ensure or vary their displacements as operational conditions require. The primary means of valve control is via one or more on-board platform system controllers 610, with pneumatic pressure supplied by compressors indicated by 609. All compressors are adapted for submarine operation, and all electronic housings are sealed for the same environment. In the event of primary power loss for the compressors (whose purpose it is to eject water from certain variably-buoyant cells, thus allowing the platform to return to the ocean surface), standby pressurized air is available (for example) in the fore and aft pontoon cells described above.

While other details of the generic platform will become apparent in subsequent discussion, the above addresses the major elements of its structure. It should be emphasized here, however, that the components described (whether in modular or unitary/inseparable form) are preferably expandable in dimension and configuration, based on the demands of the actual application and deployment site. Such flexibility is best conveyed in a modular arrangement, wherein a) the length or breadth of the platform assembly may be extended or retracted according to the dimension and number of payload cells required; b) the configuration may be made essentially horizontal, with pontoons being parallel with the seabed; c) the payload being exclusively power-generating in purpose, vs. mixed-use; d) the platform is capable of vertical-to-horizontal operational attitude, allowing for the greatest range of submarine power generation devices as the state of that art allows; e) replacement of any component of the platform as repair or upgrade procedures demand; f) a situation wherein stresses and forces in the application allow for an expansion of payload volume; and g) a situation wherein the platform may be reassigned to a different site and perhaps purpose, necessitating its reconfiguration. If a unitized/inseparable hull approach were selected over a modular one, the above benefits would be obviated to large degree; hence the modular approach of the preferred embodiment. Conversely, should a more static deployment be empirically demonstrated, an inseparable and specialized version of the present invention (perhaps as exemplified in FIG. 6B) could well be the more viable embodiment. Regardless of modularity or non-modularity in applied architecture however, and also of what other trim and other features (e.g., outer skins, protective rails, etc.) are appended, the present invention should be clearly encompassing in its fundamental form, function, and purpose.

Figure 7A:
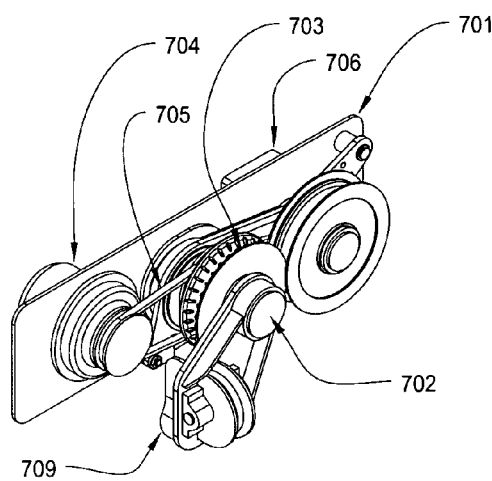
FIG. 7 contains three isometric views of a winch assembly, with FIG. 7A being from an upper forward viewpoint, FIG. 7B being from a lower aft viewpoint, and FIG. 7C looking from aft, but with the assembly's idler arm raised.
Figure 7B:
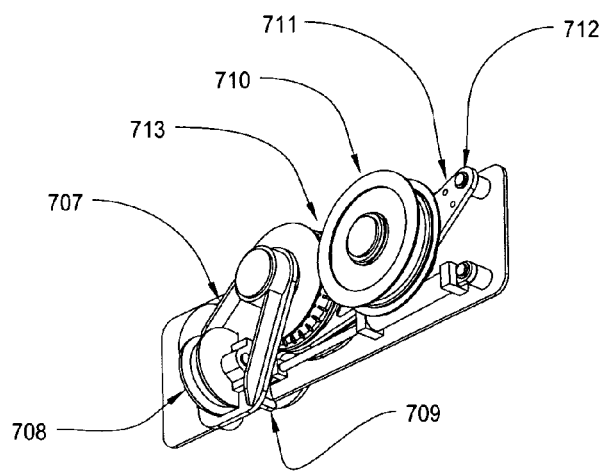

FIG. 7 focuses on the winch assembly, with FIG. 7A and 7B being, respectively, upper forward and lower aft views of this assembly in the preferred embodiment. As with other aspects of the invention, this assembly may be mechanically exchanged for a superior one, as the state of that particular art proceeds. And in view of this point, along with the various purposing of the platform in general, this assembly as well should be understood as being exemplary in nature, and non-impinging as to the novelty of the overall invention because of its illustrated details. Indeed, applications of the present invention for localized purposes might well necessitate an all-electric version of the winch assembly, or—as with a triangular or flow-perpendicular pontoon arrangement—demand a complete reconfiguration of said assembly and its winch configurations. Even so, this presented winch assembly has the purpose of causing the semi-buoyant platform assembly to "crawl" along its mooring lines to an operational depth, regardless of the motor type or final mechanical details of the sub-components involved. We will proceed then with the description of the invention with this particular winch arrangement in view, even though its design has but an exemplary role.

Beginning with FIG. 7A, the primary components of the winch assembly of the preferred embodiment are now described in detail. A base plate or frame 701, with appropriate stiffening elements, bears the various components of, and forces introduced by, the winch assembly. This base plate or frame is preferably separable in nature from its underlying members on the platform (e.g., the saddles 611 betwixt "nose" and "tail" pontoon tanks 602), by means of removable-fastener connections. Said plate or frame has as its most prominent feature a shaft 702, upon which a traction drum 703 rotates. Provided with suitable bearings, said shaft causes said drum to tractionally act upon a mooring line. For the sake of mechanical simplicity, the mooring line (in the preferred embodiment) consist of a chain, in the region of tractive engagement. Though cables could be employed for such, multiple turns on drum 703 (or a much more elaborate "tugger" style of winch, or even teeth or ribs installed on said cable) would be required for sufficient traction. With chains, however, the drum need only be supplied with teeth, spaced appropriately for the pitch of the chain, allowing minimal wrap of said line on said drum to achieve the required traction.

Energizing the traction drum is a motor 704, which transmits torque to said drum via a belt or roller chain 705. Alternate forms of such torque transmission may be readily acknowledged, and the proving out of such underscores the benefit of modularity for the overall invention, with this separable winch assembly being but another example. Even so, the presented example demonstrates a mechanically adequate approach to describing actuation of the traction drum, even though components 704 and 705 may well be discovered to have a superior arrangement (perhaps, e.g., with motor 704 being mounted coaxially with the traction drum itself).

In view of the changing attitudes of the platform in its positional states, and especially in regards to its surface vs. operational positions (see FIG. 4A & B), a feature must be introduced to the winch assembly that ensures proper wrap of the mooring line upon the traction drum. This feature, in the preferred embodiment, consists mainly of an idler wheel 710, ensuring that the mooring chain properly engages the traction drum in any and all of the platform's longitudinal angular positions. To one familiar with the art, it should be understood that the gap between the traction drum and idler wheel represents a point of vulnerability, in that the chain could jump off one or the other component in certain circumstances. Interlocking the two, and thus mechanically bounding the possible path of the chain, is a benefit provided in the illustrated winch design wherein the idler wheel 710 has outer flanges that cover the gap 713 between it and the traction drum 703, ensuring that the chain cannot be dislodged in the interface between the two.

Arising from the seabed anchor, the fleet angle of mooring chain to the traction drum is likewise of potentially considerable concern. In applications where the submersible platform 101 has an operational depth that is greatly separated from the ocean floor or an intermediate point of anchorage (as with an intermediate frame), such may not be of as great a concern. In comparatively shallower seafloor depths however, or when the application otherwise demands a broader stance of mooring line stance with respect to the platform's operational depth and dimensional separation of its winches, a feature may be required for the winch assembly that accommodates a transverse spread of mooring line anchors and reduces the fleet angle of said line for adequate engagement by the traction drum 703. Such a feature is depicted in the fairlead assembly 707, which freely pivots on main shaft 702 in accordance with the longitudinal angle of the upwardly incoming mooring chain (that is, in relationship to platform descent). Sheave 708 is further provided to accommodate transverse angular disposition of said chain, while blades 709 ensure that said sheave 708 is appropriately aligned with said incoming chain. The arrangement also ensures that the incoming lower mooring chain, at whatever transverse angle, is properly fed onto the traction drum.

Alternatively, it may be seen that the introduction of framework 209 (see FIG. 2) may obviate such a need for an inbound mooring line fleet angle handling device entirely. Regardless, a similar exit fairlead device could be installed for the idler wheel (i.e., the outbound, down-current exit of mooring line from the winch assembly); but in view of its larger flanges, and the general geometry of mooring line trajectories as applied to a particular site, such may not be necessary. If an application proves otherwise, it should be apparent that the addition of a fairlead assembly 707 to the shaft of the idler wheel 710 is readily amenable to the depicted assembly.

Figure 7C:
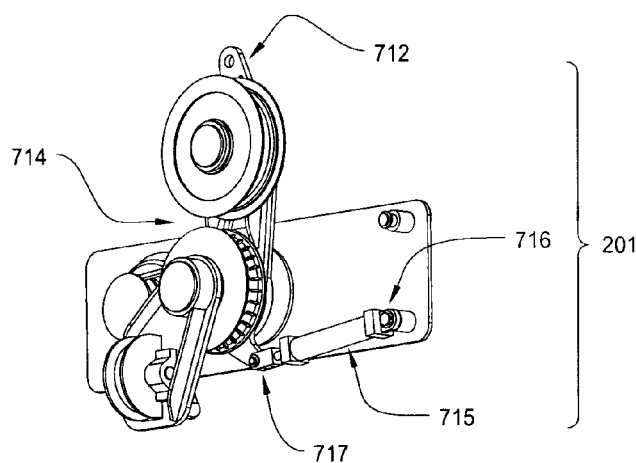

Features emphasized in FIG. 7C facilitate threading of the mooring chain onto the winch assembly, in which the idler wheel (with its capturing flanges) is shown raised by means of a hydraulic actuator 715. Acting upon the arm 712 to which the idler wheel is attached, the actuator pulls clevis 717 toward pivot 716, thus raising arm 712 through an approximately ninety-degree arc. With the idler arm being eccentrically engaged with corresponding surfaces of the main shaft 702, the capturing flanges of wheel 710 are extended away from the periphery of traction drum 703 by means of the arm being raised. In this "threading" position (with the platform being on the ocean surface), the mooring chain need only be draped over the traction drum. Once so draped, the hydraulic actuator 715 is retracted, thus lowering idler arm 712 and locking said chain between traction drum 703 and idler wheel 710. This operational position of the idler arm is further locked by pin 712, thereby relieving the actuator 715 (with its associated piping and valves) from structural and mechanical load path involvement in operations pertaining to descent, operational position, and ascent of the platform assembly. Note that pin 712 may be engaged by manual or automated means. Note also that all the above "threading" procedures may be additionally facilitated by specialized equipment aboard other surface vessel(s) involved in deployment of the platform (or the reverse procedures).

In the preferred embodiment, the winch motors (and idler arm actuators) are of hydraulic motivation; thus all hydraulic aspects of the winch assembly are managed by its associated hydraulic manifold 706, in which all valves and primary circuit logic are contained, and to which the platform system control system(s) issues appropriate commands for valve actuation. Note also that pressure sensors in the manifold can detect line pressures from and to the hydraulic motor 704, which may in turn be translated by the platform control system(s) into an electronic indication of mooring line tension.

A critical feature for emergency surfacing of the platform is also contained within manifold 706, being a remotely actuatable valve that permits motor 706, and thus drum 703, to freely rotate. Such a bypass circuit is further provided with a flow control device, such that hydraulic flow to and from the motor in this state is limited—thereby limiting speed in the "freewheeling." In conjunction with positive overall platform buoyancy, additional buoyancy provided by "blowing" certain variable-displacement volumes, and the optional use of remotely-disconnectable electrical cable terminations (as described elsewhere), such "freewheeling" of winch motors permit the surfacing of the platform even in the absence of normal (primary) power from shore, and with a controlled rate of ascent.

Figure 8:
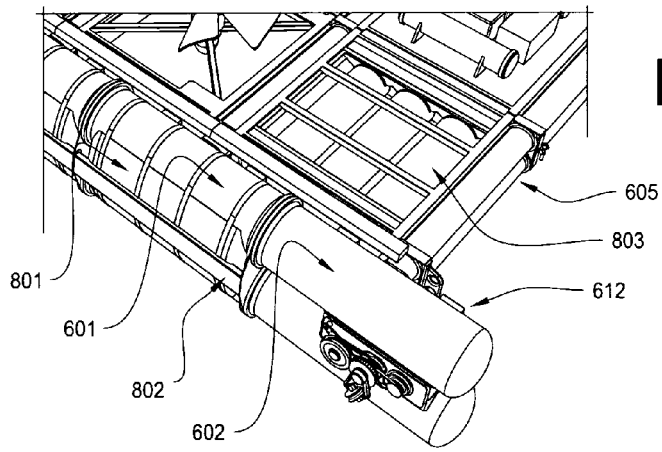
FIG. 8 shows, in isometric perspective, a portion of the platform in which exemplary buoyancy components reside.

FIG. 8 is an isometric view of a forward corner of the submersible platform, illustrating the major buoyant volume types of the preferred embodiment, and presenting opportunity to more fully explain overall buoyancy features (static and variable) of the platform assembly, and the control of such. Components 601, 602, and 605 are, as has been discussed under FIG. 6, primary structural elements of the platform, serving simultaneously as its primary buoyancy volumes as well. Some of these volumes (for example, transverse tubes 605) may remain permanently sealed (i.e., are never operationally flooded), while others are equipped for the purposes of displacement variation. The selection and position of non-floodable volumes is a matter of overall platform tonnage (including that of payload), balance, operational attitude, site application, etc., as will be evident to those skilled in the art. For example, one entire row of tanks in each pontoon may well be decided to be permanently non-floodable. Or, several forward or aft vertical pairs of cells may likewise be so sealed. The modular approach as is presented readily provides for adjustment in regards to these statically displacing volumes per the requirements of a specific application, by simple means of reworking of the applied piping circuit (e.g., provision of a valve set 612 and requisite piping, as opposed to penetrator plugs for a particular tank or "cell") without disruption to the pressure boundaries of such members.

In addition to these structural volumes, further (non-structural) inherently displacing volumes 801 may also be installed, comprised preferably of high-density (or "syntactic") foam such as is commonly used for underwater remotely operated vehicles. Such foam forms may be positioned on the platform in a variety of ways and locations, though depicted in the preferred embodiment are strapped onto the outboard pontoon surfaces, and bounded by a protective rail 802. The intent of such foam volumes is to supplement the non-floodable structural volumes, thereby producing balanced and overall buoyancy for the platform that is positive, even when other selected volumes are operationally flooded. For the floodable volumes, each has penetrators and valves indicated by 612 (located as appropriate for their function), said valves being controlled by the platform's control system(s). Additional sensors (e.g., for pressure) are also assumed for at least these floodable volumes, and perhaps for all non-floodable ones as well (to detect leakage).

In order to "blow" those volumes that have been flooded (i.e., to fully surface the platform), the primary means presented in the illustrated embodiment consists of one or more air compressors (see FIG. 6). Such compressors are selected, modified, or designed for the purpose, and have motors that are both sealed and filled with pressure-compensated oil. As a backup to this primary means of air supply, volumes 602 may be designated as "high pressure" tanks, as described under FIG. 6. Alternatively or additionally, a series of auxiliary tanks 803 are portrayed, slung under the equipment area in the platform's bow. Regardless of which volumes are designated as "high pressure," the hulls of such are of course of a much more pressure-retentive nature (e.g., thicker hulls, more internal stiffeners, or involving carbon-fiber composition or reinforcement) than the floodable volumes. Being in nature a backup supply of reserve air (that is, their contents only being needed in the event of primary power supply or air compressor failure), their utilization always means that the surfacing of the platform has been decided upon. Thus these "high pressure" volumes need be only charged while the platform is on the surface (e.g., by a service vessel), the platform itself being relieved of any higher-pressure air compressors for the purpose. Other aspects of circuit design for this ballast system are in accordance with standard practice.

It is understood that other configurations of the ballast air system may be readily conceived of that rely exclusively on charging of the higher pressure storage volumes while at the ocean surface, and by means of compressors aboard a surface ship, thus eliminating the need for compressors aboard the platform. The preferred embodiment, however, retains said on-board compressors, due to the fact that the platform may well be required to several or even many depth or attitude changes in the course of its normal operations. Such changes would, in the absence of on-board compressors, potentially require a much larger storage of air; and when consumed, surfacing to the support of a surface vessel would be necessary, only to recharge said stored air. The preferred embodiment therefore enables indefinite operational periods, with stored pressurized air being exclusively dedicated for emergency surfacing, and on-board compressors supplying the needs of normal operational depth control. Such an arrangement reduces the need for full surfacing (and the associated dispatching of a surface vessel) to matters of maintenance or repair.

Figure 9:
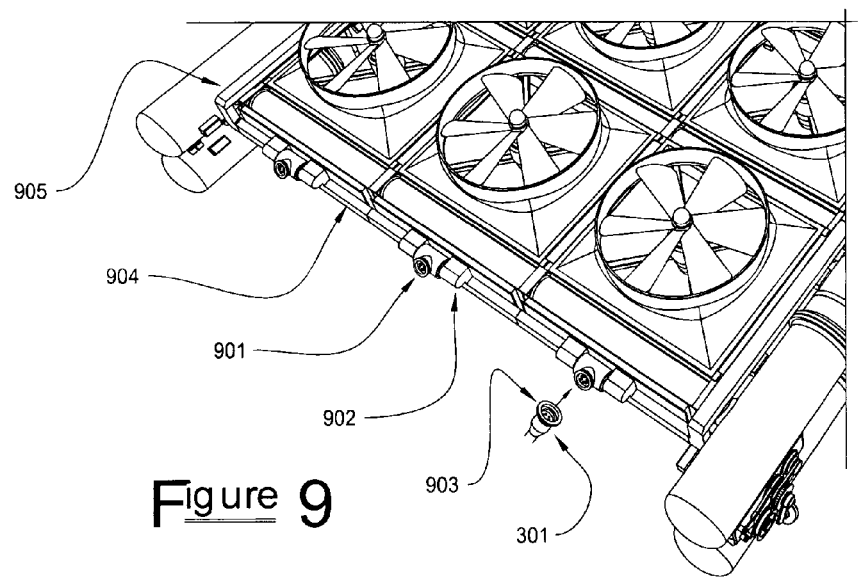
FIG. 9 is likewise an isometric perspective detail, in which major electrical features (including exemplary turbine generator units) are pointed out.

FIG. 9 shows the aft portion of the submersible platform, with discussion now turning to major electrical components (other than those pertaining to discrete energy-conversion payload assemblies) of the platform. Power cables have been described under FIG. 3, with the upper connector 301 of such being here indicated, with its mating counterpart 901 mounted to the platform. As also discussed with FIG. 3, such connection likely requires a slip ring type of transverse swivel, indicated generally by 902. The number and arrangement of such a swivel and connector set are determined by the platform's specific application. A locking collar is indicated by 903, though such may be located on either side of the male and female connector set. This locking function may be optionally disconnectable by remote and mechanical means, should an operational scenario require the addition of such. Alternatively, the connector set may be designed to separate with sufficient cable tension.

Beyond the power cable connection are wiring requirements aboard the platform, such wiring being, for the sake of protection and organization, preferably run in raceways 904 and 905. Such raceways are not sealed against water incursion, but only provide mechanical protection of cable runs. In accordance with typical technologies for other types of undersea vehicle, cables proper are run within flexible sealed conduit that is filled with compatible (e.g., non-conductive) oil selected for the purpose. Such oil is pressure-compensated, again per standard practice, by means of compressible accumulators that maintain said oil at a pressure equalized with the ambient pressure of surrounding seawater. These compensators are sized and located as the various subsystems require. As is understandable by one learned in the art, such ancillary components are, as with on-board cable layouts, switchgear devices, control sub-components, and other innumerable devices at the detail level, unnecessary for elaboration in the presented drawings or specifications.

Figure 10:
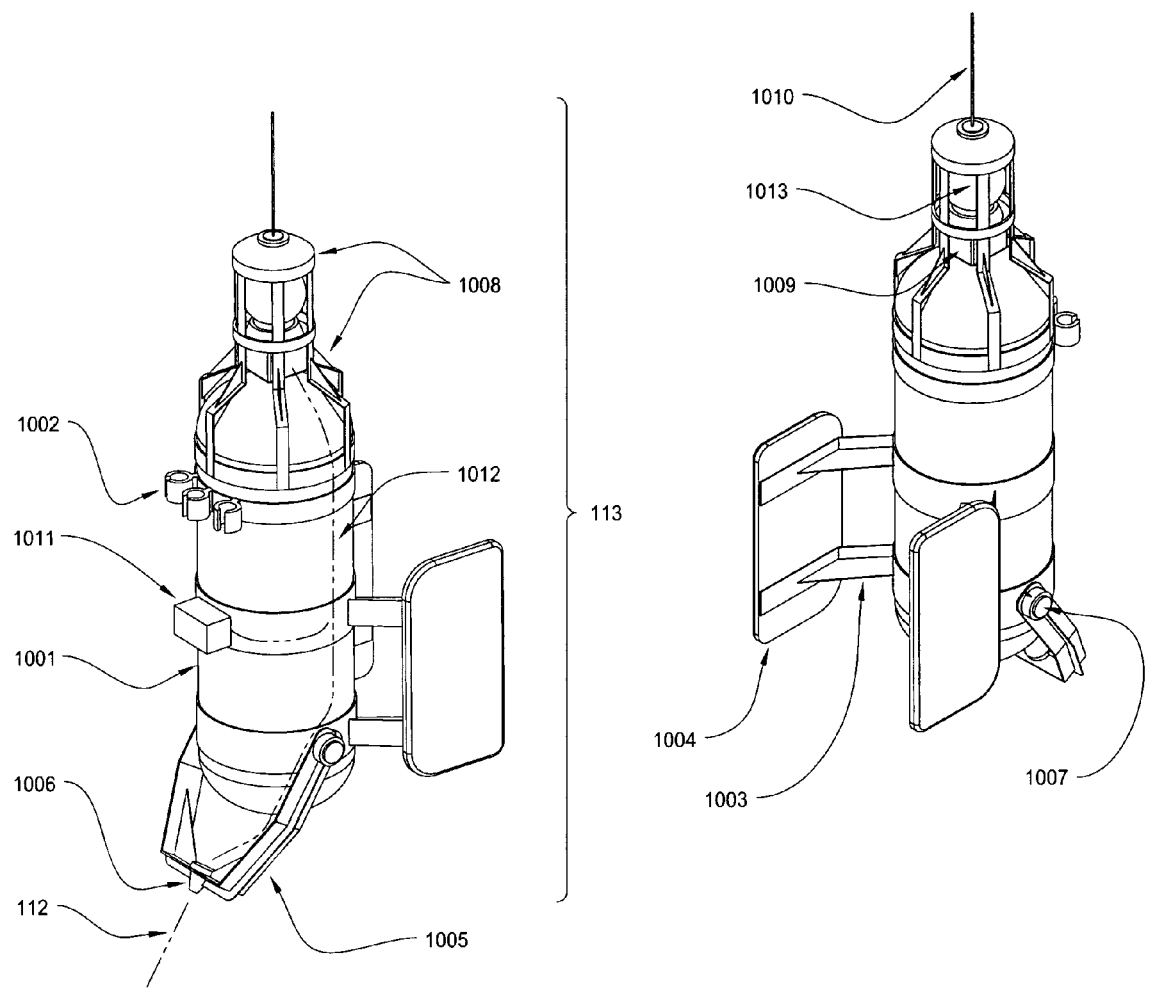
FIG. 10 depicts a buoy that has as its purpose the retention of electrical cables, such retention being prior to the deployment of the platform, or between deployments; and having the further purpose of transmission of wireless signal from the platform to one or more remote facilities.

FIG. 10 demonstrates an exemplary arrangement of a surface buoy, designed to serve the dual purposes of retaining a cable connection at the ocean surface prior to or between platform deployments, and the containment of electronic communications equipment. Much has been discussed already within the context of FIG. 2 and need not be repeated here, except to point out in better detail the major features of this "cable management buoy" 113. These features begin with a hull 1001, which may be understood as being configurable in a number of ways (with only a simplified approach being illustrated). Said hull is sized to provide sufficient displacement so as counteract the weight of not only the buoy itself and its mounted equipment, but also of any residual weight of associated cable(s) and tether(s), and the effect of current forces acting thereon. However, the cable and tether weights are, as described earlier, kept at neutral or positive buoyancy by means of flotation devices affixed along their length, rendering this factor of load requirement for the buoy as minimal.

Attached to the buoy's hull are one or more receptacles 1002, which are sized and designed for the cable(s) and connector(s) to be retained. Not shown are ancillary features that may be deemed desirable, such as protective shrouds for the connectors, tamper-proof locking devices over the cable terminations, cable chafe guards, and so forth.

A frame 1003 supports fins 1004, ensuring a particular current-induced orientation of the buoy, with respect to mooring line tension and surface current direction, as described earlier. The pivoting yoke 1005, to which the buoy's tether 112 is attached, acts in concert with these fins, ensuring (in view of consistent current forces) that the buoy does not spin. Such spin would induce undesirable twisting to cables or tethers, and would also entangle the same when cables are being held at the ocean surface. The yoke and fin arrangement is therefore designed to preclude such a phenomenon. If tether twisting is deemed of particular concern for a specific application, an axial swivel may augment its attachment point 1006 on the yoke, though such should generally be unnecessary. As has already been discussed, the buoy is preferably positioned by ocean currents directly down-current of the deployed platform, that is, roughly centered with it and the site of deployment. Thus the fins are preferably perpendicular to the axis of the yoke's pivot axis 1007, and parallel (in plan view) with the up-current direction of tether 112.

Another mounting frame 1008 serves as a superstructure for electronic equipment, with the latter driving the size and arrangement of the former. Transceiver equipment is generally indicated by 1009 and antenna(s) 1010. Means of signal communication between buoy 113 and platform 101 has been addressed in the context of FIG. 3, with both methods being diagrammatically indicated here. First is a signal cable or conductor 1012 proceeding from the tether 112 to the transceiver equipment 1009. Alternative to or in supplement to this is a second means of communication, comprised primarily of an underwater acoustic transponder 1011. The advantages and disadvantages of either approach are evident to those learned in the art, the decision (for the employment of one, the other, or both) being affected by factors such as whether the buoy is supplied power via its tether (vs. on-board batteries); whether the application and data transmission is amenable to acoustic transpondence (and any lower baud rates and channel limitations associated thereto); signal security; cost of tether 112; and so forth. The present invention does not depend on this decision of communication means, however. Indeed, signal communication via seabed cable (i.e., directly to a shore-based facility) may be deemed entirely and exclusively adequate, with both methods above being obviated. The preferred embodiment though suggests such an alternate (and backup) means of such communication via this buoy, an added advantage of such being direct communication with (and control of) the platform assembly by a surface support vessel during deployment, retrieval and servicing operations, regardless of connectivity to main (shore-originated) power/signal cable(s).

Figure 11:
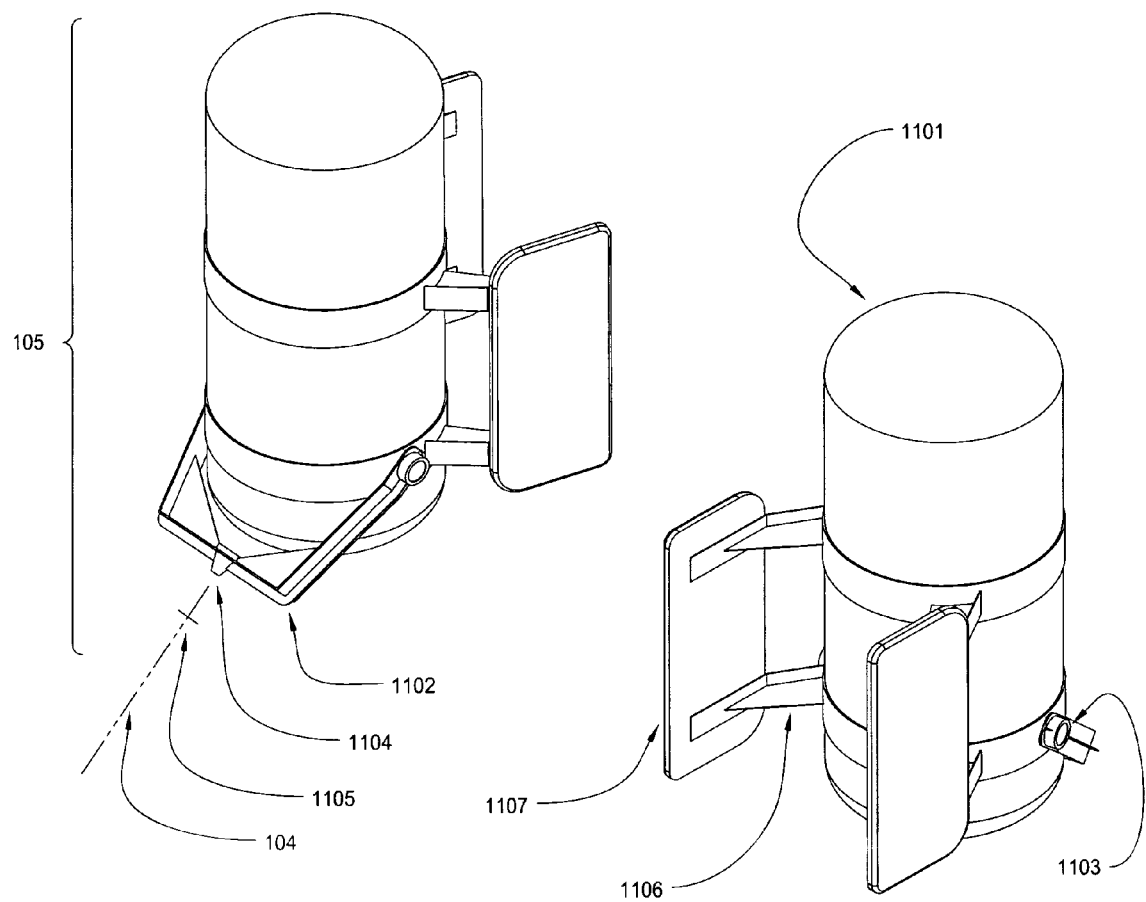
FIG. 11 portrays a mooring line buoy that is, like that of FIG. 10, similarly equipped with a line yoke and directional fins.

FIG. 11 portrays the mooring line buoy 105, the major elements of such having been prior discussed within the context of FIG. 2, though are seen in this figure in greater detail. Like the cable management buoy 113, this assembly's structural arrangement is illustrated in simplified form, though based on standard technologies. Only the features especially important to the invention are emphasized. The buoy consists of a hull 1101, with a yoke 1102 secured by pivoting attachment points 1103. The mooring line 104 is secured to said yoke at attachment point 1104, with an optional axial swivel 1105 to alleviate any twist in said line.

As with the cable management buoy, this buoy is also outfitted with a frame 1106, to which fins 1107 are secured. The purposes of the yoke and fin combination are substantially the same as for the cable management buoy, and have been discussed under FIGS. 2 and 10. The main difference here, however, is that the pivot axis 1103 is not perpendicular (in plan view) to the fin orientation, but at an angle greater than or less than ninety degrees to such. This angular difference renders the fins as not being parallel with incoming direction of mooring line 104 (in plan view), which is determined by the ocean current. Thus the same ocean current, acting upon the surfaces of said angularly-oriented fins, causes the buoy to move transversely away from the longitudinal centerline of the installation as a whole, promoting transverse line separation as described under FIG. 2. The direction of this fin angle depends on which side of the platform (port vs. starboard) to which the associated mooring line is to be engaged. The magnitude of the fin angle is determined by the application, in view of intended operational depth of the platform, overall mooring line length, current speed, and amount of surface separation desired for the port vs. starboard buoy pairs. This fin angle, therefore, should preferably be adjustable in nature, by virtue of the attachment means of its frame 1106 to the hull assembly 1101.

It should be apparent to those learned in the art that the size of the mooring line buoy and the structural design of both it and its yoke are dependant upon the loads to be carried by the yoke—that is, the supported length and weight-per-foot of the mooring line, which are themselves driven by the overall platform mass (including payload) to be retained at operational position, current speed, and maximum operational depth. From that maximum depth position (see FIG. 2) upward to the surface, the platform's winch assemblies must tractionally engage said line, thus precluding the attachment of flotation devices for and to that length of mooring line. The entire weight of this length must therefore be borne by the associated buoy 105, perhaps necessitating its volume to be quite large. Note, however, that specific dimensions or even relative scales are not intended to be conveyed in the presented drawings; indeed, a quite different configuration to that shown may be required, though without constricting the scope of the present invention.

Figure 12:
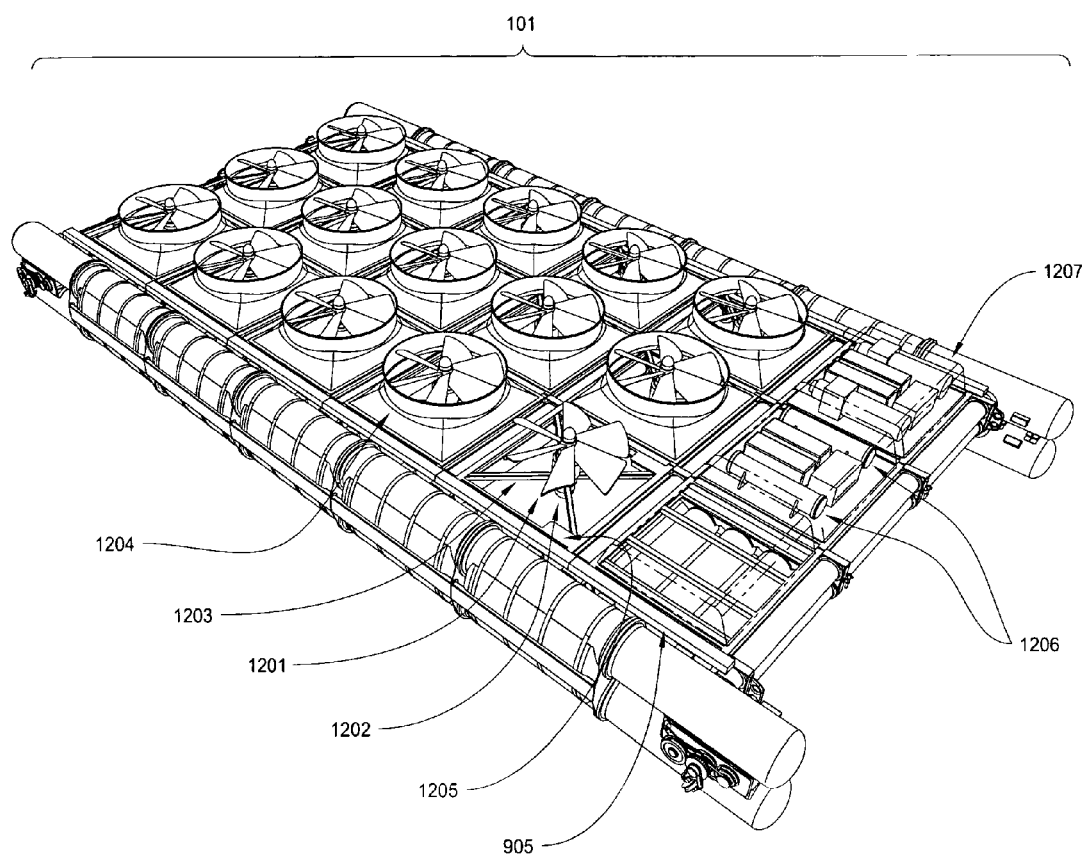
FIG. 12 is an isometric perspective view of the entire platform, having a full and illustrative payload of hydroelectric turbine generator assemblies, with an emphasis placed on components and processes related thereto.

Turning next to FIG. 12 and its isometric perspective view of the entire submersible platform assembly 101, which is in this case is portrayed with a full complement of hydroelectric turbine devices as payload. This form of payload illustrates a particular purpose for the generation of electrical energy, and the direct transmission of such product to an off-board facility. Indeed, such a purpose may become the most useful application for the presented submersible platform invention. However, it should be apparent that by reassigning payload-bearing structural cells to equipment packages other than those designed for strictly electrically generative objectives, many alternative purposes and means may be achieved with same essential invention. Such alternate outfitting might support, or even encompass, such undersea activities as mining, oilfield drilling and oil extraction, aquaculture, scientific data collection, and the energizing of off-board military equipment or even submarine habitats. Such alternate outfitting could easily facilitate the conversion of kinetic energy to a potential form, such as battery charging, on-board hydrogen conversion, or electrical supply to another vessel equipped with such means.

So while the arrangement depicted in FIG. 12 illustrates a payload exclusively devoted to power generation, certain payload cells may well be employed for other types of mission-specific equipment. It is assumed, however, that the platform will generally have at least one device that converts the kinetic energy of ocean current to an electrical form, as either an intermediate or final product. Note that the system, however, is flexible enough though to have a mixed-use payload arrangement, to have a transmissible or transportable energy product, and to be combined in a plurality of concerted platform deployments that together act as a greater composite installation. Such flexibility is inherent in the invention; yet a preferred application exclusively designed for power generation for at-shore consumption is now the focus of discussion.

The submersible platform 101 is capable of carrying and facilitating a number of forms of hydroelectric conversion device payloads, though the basic and proven axially-arranged design is portrayed for the preferred embodiment. Such a turbine fundamentally consists of an impeller assembly 1201, and a housed and sealed generator assembly 1202. The complexities and detailed contents of such undersea turbines need not be elaborated upon herein, being as they are both commonly known, commercially available, and evolving in the state of their art. That a customized such payload device will be required for the invention is evident however, given particulars of mounting, intended operational depth, aqueous funneling, impeller diameter, application purpose, current speed, optimal blade quantity, surface area and pitch angle, electrical connectivity, diagnostic sensing, foreign object screening, and so forth. As stated earlier, the modular approach to payload mounting allows for the ready exchange of such turbine (or otherwise configured) assemblies for reasons of maintenance (one or more being replaced by new or refurbished ones); but the point deserves raising here, that the parameters of a deep-ocean turbine design have not been fully addressed. Even so, the present invention accommodates the replacement of such assemblies, as that state of the art evolves.

Though alternate designs of submarine energy-conversion devices might require otherwise, the preferred embodiment illustrates the operational platform to be vertical (or nearly so), and positioned substantially normal to the current flow, thus causing impellers 1201 to rotate. Such impellers are directly and axially coupled to their generators 1202, producing electrical energy thereby. It should be noted that some submarine hydroelectric turbine devices in the industry (whether experimental or otherwise) employ an actively controlled pitch for the individual blades of the impeller. Though such pitch control may become desirable in certain applications of the platform (especially in a tidal environment), and is of course readily supported by the presented invention, such is not depicted in the preferred embodiment. This is due to the preferred application being situated for a condition of unidirectional current flow, and the fact that the platform in its entirety can be remotely commanded to a horizontal position (should weather-driven events or severe currents require), thus bringing all turbines out of an optimal orientation in regards to the ocean current. Such "feathering" of pitch can thus be supplied to the blades of individual turbines by virtue of attitude of the platform as a whole, with no further complexity of turbine-resident equipment. This inherent capability of the platform therefore obviates, in large degree, the need for the multitude of pitch control mechanisms that would be otherwise required, regardless of application. Note also that the platform can be adjusted for these purposes to any angle between zero and ninety degrees (relative to the horizontal plane), and that—in the case of a very severe subsurface current or turbulence event—be brought to a most protective attitude of horizontal (in addition to an increase of depth). In such a position, the structure of the platform itself forms a protective barrier around all turbine (and other payload) devices.

Returning to the discussion of major electromechanical characteristics, the turbine components are mounted upon frames 1203. Note that the perimeter of said frame or frames serves as the basic dimensional interface for any payload assembly, which may be readily disassembled from the generic platform structure. A shroud 1204 is further depicted, such shroud funneling a somewhat larger cross-sectional area of current flow to the active surfaces of the impeller, thus improving the efficiency of said turbine.

It should be noted that payload assemblies (including those of turbines) might span more than one payload cell, or occupy only a portion of a cell, depending on the scale and configuration of platform structure vs. that of the payload device. For the sake of simplicity, the preferred embodiment portrays a one-to-one relationship between payload assemblies and underlying structural cells or frames. Further, though platform system equipment (compressors, batteries, control enclosures, etc.) are shown as occupying the entirety of the bow row of payload cells, a particular application (even when power generation comprises the exclusive purpose) may have such support equipment occupying (relatively) more than or less than the comparative space portrayed.

For maintenance, installation, and other pragmatic reasons, each turbine payload assembly is, in the preferred embodiment, intended to contain a local electrical enclosure, located beneath or above the region identified by 1205. Such an enclosure facilitates the purposes of electrical connection of the generator device to on-board cabling, and the containment of local (i.e., unit-specific) and remotely operable switchgear that permits the unit to be selectively engaged with or disengaged from the platform's power buss. Note that such switchgear may be accompanied by separate overload protection devices, or itself integrate such functionality for the discrete generator. The energy-conversion payload device further incorporates local sensors (such as for rotational speed, amperage produced, etc.), enabling discrete diagnostic evaluation via the platform control system(s), with the local electrical enclosure (or enclosures) containing any adjunct discrete electronic components. Should an individual unit fall beneath required thresholds, such sensors make the fact known to operators at a remote facility (via the platform control system(s), who in turn have the choice (via the above mentioned local switchgear) to take the particular unit offline.

Power and signal cables proceed from the energy-conversion payload device to down-stream power management devices (e.g., switchgear, circuit breakers, control and monitoring devices, etc.). Such cables are preferably encased in the same pressure-compensated, oil-filled flexible conduit as described in the context of FIG. 9, and run primarily within raceways 905. Such raceways may as easily be run along structural members 608 (see FIG. 6), and not just in the outboard positions shown. These cables, for a particular application, comprise an overall wiring harness for the platform as a whole. So as not to disrupt this harness in the event of unit replacement, the local electrical enclosure(s) of a given payload device is equipped with underwater electrical connectors suitable for both power and signal as necessary.

While the discrete energy-conversion payload device contains electrical and electronic components necessary for its local operation and monitoring, the processing of their signals (e.g., in diagnostic and command functionality) is handled by the platform's on-board system controller(s), located within housings 1206. Unlike most other electrically oriented devices aboard the platform, these housings are not oil-filled. Instead, in congruence with standard practice for undersea remotely operated vehicles, they are pressure-sealed and kept at one atmosphere (i.e., internally dry). Connectors across their pressure boundary are therefore designed and rated for such use, in view of maximum operational depth for the application. It is understood that in the preferred embodiment the local electrical enclosures for each hydroelectric assembly will likewise be so sealed and internally dry, should they need to contain any sensitive electronic components in support of their locally managed processes.

Given the amount of discrete signals to manage (for the entirety of platform and payload sensing and commanding functions), a networked approach to signal distribution is preferred. Regardless, the system controller 1206 and related devices may be contained in one, two, or more housings. The portrayal of specifically two such housings in the drawings need not therefore be considered as restrictive for the invention's novelty. Regardless of number, and as with other general platform support equipment mounted in the bow area, a protective and removable shroud 1207 preferably encloses the system controller equipment.

In all operational aspects, it should be evident that—as with any modern power plant—computers and purpose-built software are involved. At one level, the on-board platform system controller incorporates all electronic components necessary for internal management of and communication with its systems, including one or more programmable microprocessors, memory storage devices, input/output modules, signal conditioners, amplifiers, and so forth. At the higher level is applied software for monitoring and control of all aspects of the platform system and its payload, operated by personnel either on-shore, on-board a surface vessel, or both.

As part of the platform assembly's electronic communications systems, means of underwater acoustic transpondence of signal is preferred as a standby means, such being in communication with the communications buoy, a surface vessel, or both. Other electronic equipment of the overall control and monitoring system may further include, as required per the application, sensors for water temperature, anti-collision sonar, video cameras and associated lighting devices, etc.

Figures 13A, 13B, 13C:
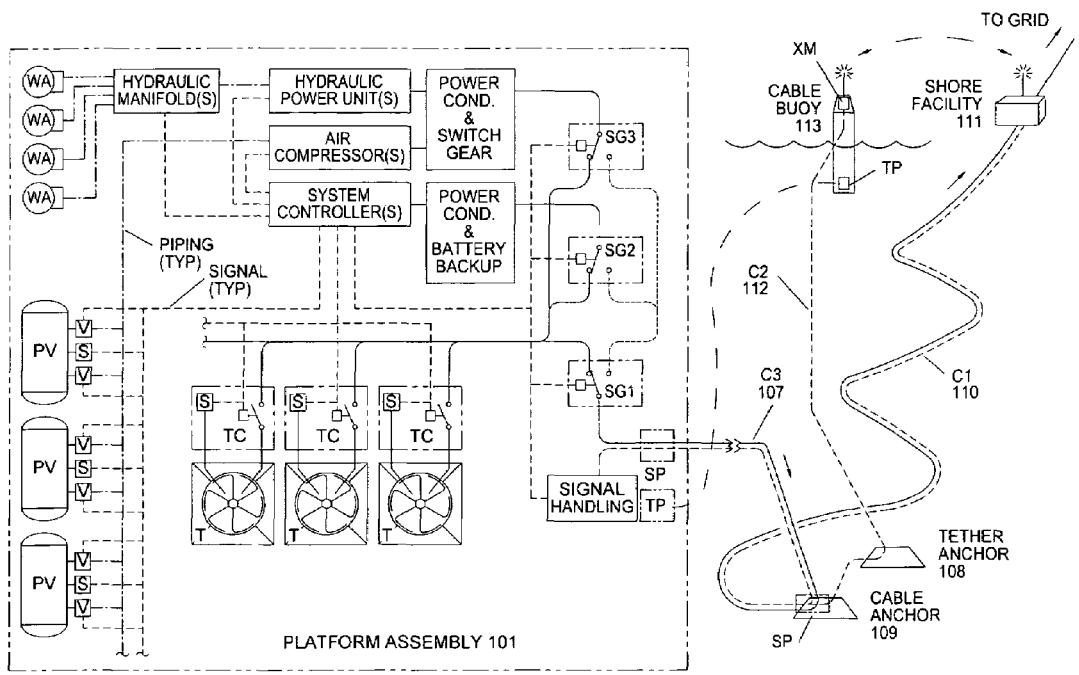
FIG. 13A is a schematic diagram of a functional interaction between major elements of the invention, in an application wherein hydroelectric power generation (and conveyance of such power to a shore facility) is the objective.
FIG. 13B is a table explaining the various graphic line types used in the schematic diagram, conveying as they do differing functional processes.
FIG. 13C is a table of abbreviations employed in the schematic. These two tables apply as well to FIGS. 14 through 18.
Figures 14, 15:
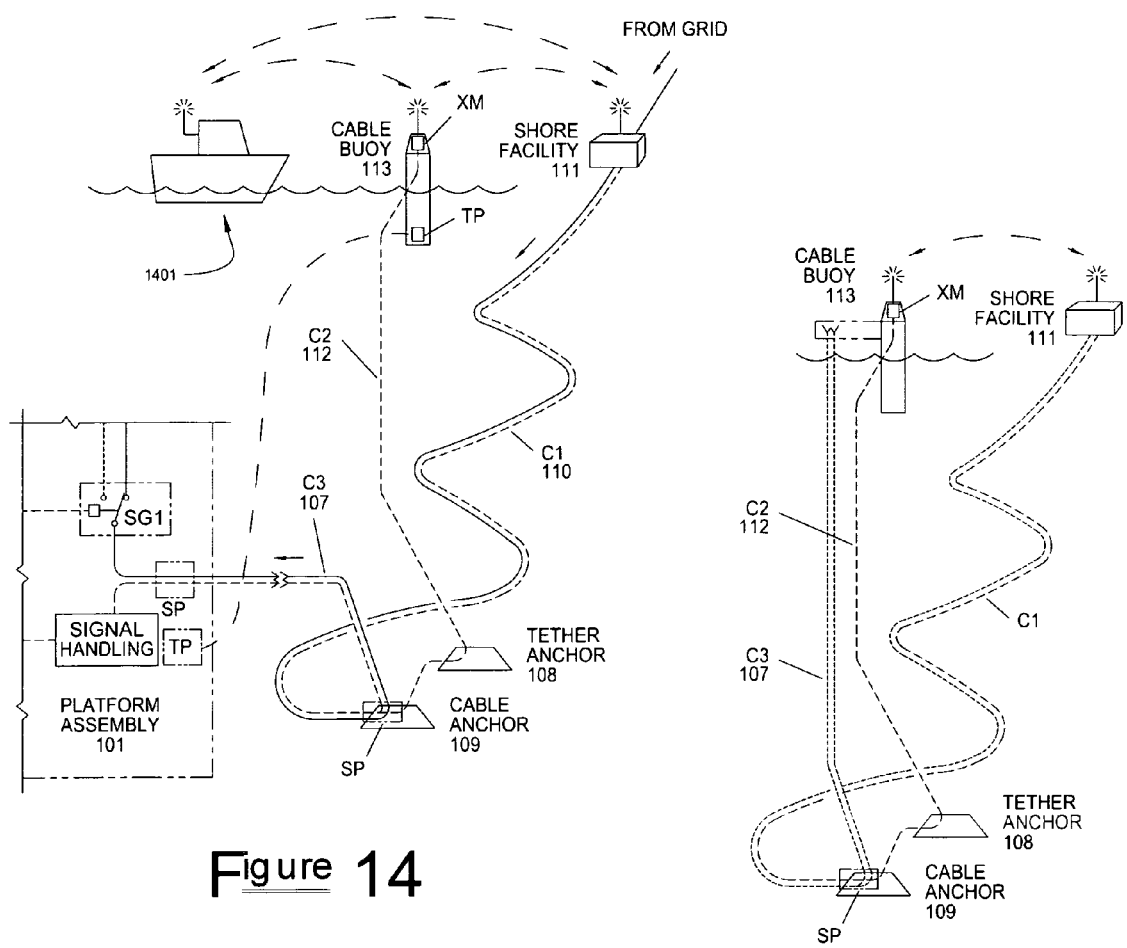
FIG. 14 is an extension of FIG. 13, with the platform functionally and illustratively undergoing either deployment or extraction operations.
FIG. 15 is a companion schematic diagram to FIGS. 13 and 14, showing an example of the subsea site prepared to accept the submersible platform.
Figure 16:
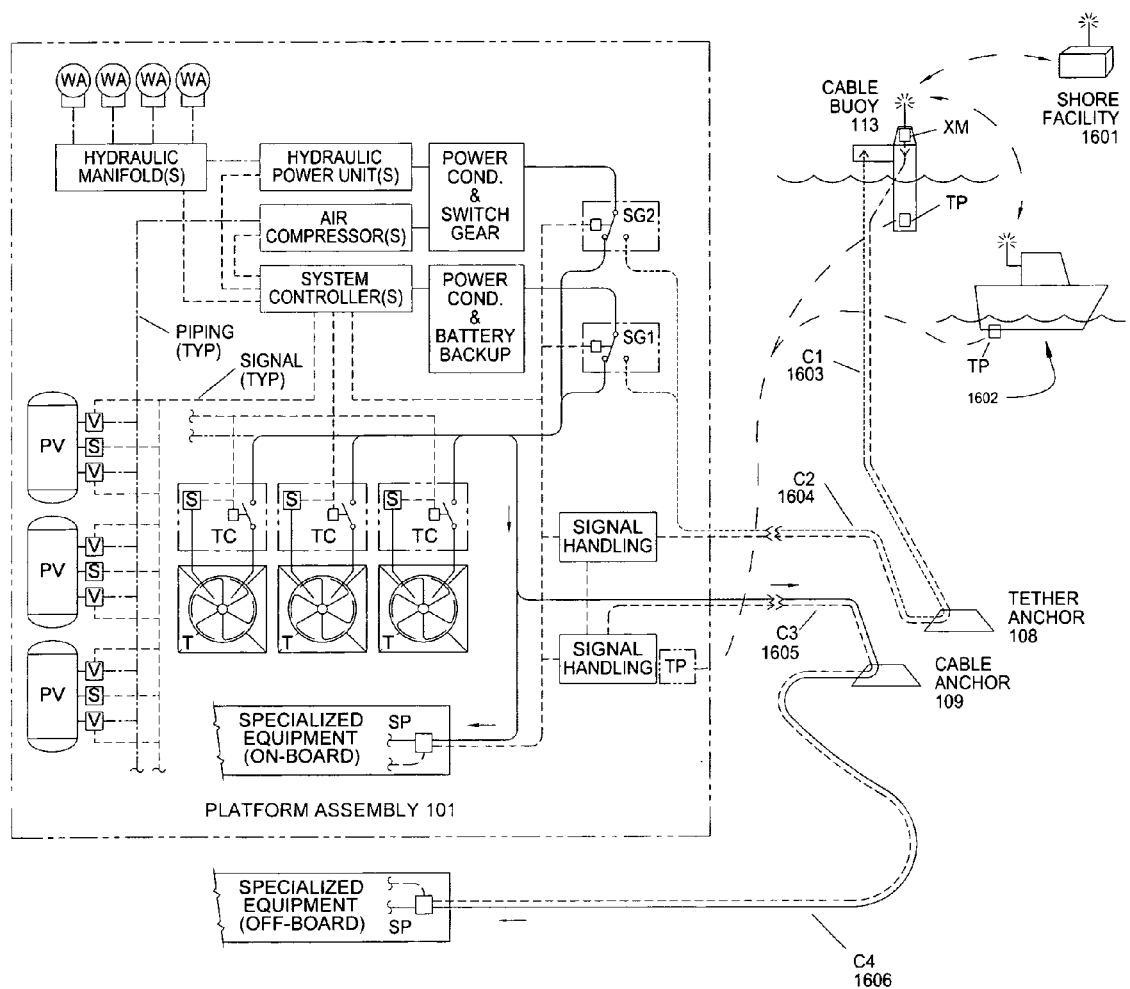
FIG. 16 is a exemplary schematic diagram of functional interaction between major elements of the invention, in an application wherein hydroelectric power generation is intended for the support of local undersea operations (e.g., in support of mining or military purposes in the vicinity of the platform).

The remainder of the drawings, FIGS. 13A to 18, comprise functional schematic diagrams of major systems involved in the present invention, with FIGS. 13a, 14 and 15 relating to the preferred application, and FIGS. 16 through 18 relating to a alternate applications. These diagrams are rudimentary in nature, indicating only primary elements and relationships, and should not be construed as being finally defining of electrical, hydraulic, or pneumatic. FIG. 13B constitutes a symbol table, in which the various graphic line types employed in these schematic diagrams are explained. FIG. 13C constitutes an abbreviations list, likewise applicable to all the schematic diagrams.

FIG. 13A presents a schematic diagram of the platform as applied for the purpose of electrical power generation, wherein such energy is conveyed to a shore-based facility, where the payload devices are hydroelectric turbines being kinetically acted upon by the ocean current, and where the platform is in an operational (that is, energy-producing) position and attitude. In this state, power is being channeled from the accumulated output of hydroelectric turbine assemblies T, through switchgear SG1, along cable 107 (such cable being secured to the seabed by anchor 109), and thence to a shore-based facility 111 via seabed cable 110. Communications (both diagnostic and commanding in nature) are conveyed by signal conductors resident in cables 107 and 110 in a "hard-wired" fashion, and—in confirming and backup fashion—by a wireless link between the transceiver XM within the assembly of cable buoy 113 and the shore facility. This latter mode of communication requires signal transfer between the cable buoy 113 and the platform 101 by means of either conductors partnered with or integral to tether 112, and/or underwater wireless transmission via acoustic transponders TP. Note that switchgear SG1 (as with other such devices depicted) encompasses requisite switching devices (with all necessary poles being accommodated, and is either accompanied by or itself serves as overload protection for the wiring and power consumers involved.

In this operational condition, motive components of the platform assembly itself (e.g., hydraulic power units, air compressors, and other support systems) are capable of being energized by electrical energy produced by turbine units T aboard the platform, indicated by the position of switchgear symbol SG3. The system controller likewise receives power via switchgear SG2. These on-board power consumers are equipped with sufficient power conditioning and individual overload protection equipment, though the system controller is further supported by a battery backup (uninterruptible power supply).

Such back battery devices are maintained at an optimal state of charging, and are therefore capable of energizing all emergency surfacing components (e.g., the system controller itself, valves that release air from "high pressure" tanks to other volumetric structural cells, and valves that allow the hydraulic winch motors to "freewheel") in the event of loss of normal (i.e., shore-originated) power availability. Such could be caused by the accidental severing of either cable 107 or 110, which would be the normal (that is, primary) conductor of power for energizing the on-board hydraulic power unit(s), air compressors, etc. during normal ascent procedures. Such battery devices are furthermore sized such that all emergency-surfacing operations may be concluded in their entirety. Note that in such an emergency surfacing scenario, such may (in view of reduced overall buoyancy) likely result in the presentation of the platform in proximity to (though not necessarily above) the ocean surface, that is, near enough for servicing, final ballast tank blowing, and/or towing by a surface vessel.

Various valving and sensing for individual floodable volumes PV have been discussed prior, though the signal communications between them and the system controller(s) are emphasized in this diagram. Likewise, discrete sensors and switchgear of individual turbine units are similarly linked with the system controller(s), as are other electrically operable components aboard the platform (that is, other than those used only at surface, or those contained in and entirely managed by a payload assemblies).

FIG. 14 presents the platform in the same application of FIG. 13, though in a condition wherein said platform is either descending to, or ascending from, its submarine operational position. In this state, switchgear contained within the shore facility 111 now supplies power to the platform for as long as the descent or ascent operation requires. Note that no loss of communications connectivity is lost, in either primary or backup means. Further, a surface support vessel 1401 may have access to such data stream (via the through-air or through-water wireless communication means, and may optionally be granted permission from shore personnel to control platform 101 through the duration of its descent or ascent procedures.

As to the platform itself, switchgear SG1 here directs shore-originated power to all on-board power consumers, with switchgear SG2 and SG3 presenting a further option of operational flexibility in this regard. In a normal descent/ascent operation, the winch assemblies WA are functioned to gently and controllably "crawl" the platform downward or upward, with buoyancy of tanks PV being controlled by valves V (that is, being so commanded by the system controller), and (in ascent) pressurized by the on-board air compressors. Thus the benefit of "making" power connections to the platform while at surface provides also the benefit of powering said platform as it descends and ascends. In between those operations (that is, in the operational state of FIG. 13), these cables comprise the same conduit by which the platform system provides energy back to the shore facility 111, and thence to the power grid at large.

FIG. 15 shows the site-installed components of the preferred embodiment in the absence of platform 101, that is, prior to or between platform deployments. As described previously, power cables 107 are retained at surface by the cable management buoy 113. Due to the action of switchgear resident in the shore facility 111, all power conductors are inactive. Even so, the signal link through cable 110 and tether 112 may still be available (perhaps enabled via comparatively miniscule signal power being transmitted from shore), thus providing means for shore personnel to perform essential diagnostic verification of said cables and also of both primary and standby communications between the cable management buoy 113 and said shore facility. Other diagnostic aspects for this "ready-and-waiting" condition may include (via the appropriate addition of sensors), as the application requires, the monitoring of mooring line and cable tension, buoy position, sea surface conditions, current velocities, power line impedance, and so forth. In effect, the system as shown in FIG. 15 represents a "closed loop" circuit that provides numerous diagnostic functions for the remote site and associated equipment, even in the absence of the platform assembly proper.

An alternate deployment of the present invention is depicted, in diagrammatic form, and in its operational state, in FIG. 16. Though representing a complete alteration of purpose (and indeed destination for the electrical energy produced), platform assembly 101 remains essentially unaltered, though certain on-board electrical and payload equipment has been exchanged or reconfigured. The differences in this exemplary application begin with the absence of power cable connectivity to a shore facility 1601, due to a purpose of supplying generated power to localized undersea activities. A small communications cable might still be laid to a shore facility in many situations; even so, the figure deliberately illustrates a "worst case" deployment in terms of electrical isolation, demonstrating the flexibility of the present invention in a more extreme application.

In an absence of any "hard-wired" link to shore, communications may nevertheless be wirelessly established between cable management buoy 113 and either a shore facility 1601, ocean surface facility 1602, or both. Communication between said buoy and platform 101 are accomplished by both or either means of a "hard wire" connection via tether/cable 1603 and cable 1604, or via acoustic transpondence between equipment TP (which said surface vessel 1602, additionally or alternatively to buoy 113, might be so equipped). Communication between any such surface vessel and shore station in this scenario are assumed secure encryption of signal. Note that mechanical tether 112 is assumed as present for the maintaining of station of buoy 113, though is not represented in this and the associated subsequent figures because it is not necessarily involved in the electrical circuit. Yet if communications needs require, it can be made conductive of signal between the platform and said buoy, as in the primary application of FIG. 13A-15.

Returning to the platform assembly itself, certain payload cells may contain application-specific equipment having further requirements for power and signal conveyance, such being accomplished by further on-board cabling and electronic control equipment. Alternatively or additionally, certain specialized off-board equipment may be likewise in such need, the power and signal conveyance for which being accomplished by cables 1605 and 1606. Note that the signal splitters SP, as with the preferred embodiment of FIGS. 13 and 14, may consist of simple terminal blocks (if signal is conveyed via dedicated and sufficiently shielded conductors residing in the cables), or electronic decoders/encoders (as in a motif wherein signal is "multiplexed" upon power conductors). The remainder of the schematic circuit is much the same as in FIG. 13A.

FIG. 17 is an extension of FIG. 16, schematically showing the same application of the latter, but (as with FIG. 14) with the platform 101 undergoing an ascending or descending procedure. Even though the essential nature of the invention remains undisrupted in this application, several applied elements are clearly seen as configured differently. First, cable 1603 has been removed from its buoy 113, and mechanically and electrically installed onto surface vessel 1701. Communication is now conveyed directly between platform 101 and the surface vessel 1701 by means of this cable 1603 (and 1604), said cables simultaneously providing power from said vessel for the platform's motive equipment (e.g., hydraulic power units and air compressors). If the buoy 113 is equipped with battery power or a transmissive tether, it may continue to confirm signal communication via transponders TP (or signal conveyance via tether 112, not represented); however, as the surface vessel 1701 may as readily be so equipped such communications equipment, the buoy may be understandably removed from the functional equation at work here in this temporary state. Note that since a "hard wire" link is established between surface vessel 1701 and platform 101 (via cables 1603 and 1604) and since the platform maintains such a link with application-specific subsea equipment via cable 1605 and 1606, power to and signal from/to the latter equipment are likewise maintained throughout the procedure.

FIG. 18 is a further extension of FIG.16, showing in diagrammatic form the deployment site, in this alternate embodiment, in the absence of the platform 101 and any surface support vessel (i.e., in a "ready and waiting" condition, as with FIG. 15). Cable buoy 113 must now retain three cables. Cable 1603 is normally attached to the buoy, only being transferred to a surface ship (as depicted in FIG. 17) in operations involving descent or ascent of the platform. Cable 1604, which is operationally connected to the platform, must now also be retained at surface, likewise any cable 1605 that would be otherwise operationally connected between the platform and any off-board (e.g., seabed-resident) specialized equipment. It should be evident that in this diagrammatic depiction of an alternate (and extreme-case) application of the invention, many arrangements are possible, even though the essential elements of the invention remain intact.

As closing comments to the detailed description of preferred embodiments of the invention, certain summary points should be added that have not been given the same opportunity elsewhere. First, the flexible nature of platform payload permits the installation of ocean-current-based energy conversion devices and systems yet to be developed in the future, as the state of that art evolves. Such future devices might embrace not only improvements in submarine hydroelectric turbines, but also improvements in technologies related to (for example) deep-ocean application of power generative devices based on oscillatory motion; impellers conveying energy via pneumatic or hydraulic means to a separate and possibly aggregate-intake motor/generator; turbines with axes perpendicular to the flow of current; conversion of current-based energy and ocean water into hydrogen (such hydrogen being conveyed to a surface vessel, or directly to shore); charging of fuel cells or battery devices; etc. Thus though the more direct form of energy conversion via axially configured turbines is indeed highlighted in the preferred application of the present invention, it should be readily understood that the essential characteristics of the invention are amenable to a broad range of alternate payload devices both present and future.

Second, it is apparent that the present invention might be deployed in plural manner. In the preferred application of the hydroelectric generation of electrical energy for shore-based consumption, such a plurality would comprise an array of such platforms and deployment sites, and (with a single shore-based monitoring, control and distribution facility) a composite power plant in their totality. Third, provided that proper conditions in the ocean proceed along a given geographic region, such a array could be successive ones, each serving as an additional power plant, or an expandedly composite one. Fourth, the maintenance of any such array, or set of arrays, makes the economic viability of purpose-built service vessels and common or like-kind shore-based service facilities more evident. That is, in any localized proliferation of the present invention, service and maintenance cost would be reduced by specialization of related vessels, facilities and equipment serving such purposes for all platforms so involved. Fifth, the same array-based concept of platform deployment makes the economic viability of specialized installation (cable-laying, anchor-setting, buoy attachment, junction installation, flotation affixing, etc.) vessels seem equally clear, with such tasks perhaps being functionally integrated into a single such vessel. Sixth, it should further be evident that the platform assemblies proper may be outfitted with payloads other than exclusively such assemblies that convert kinetic energy into another form. Seventh and finally, in view of a plural deployment and multi-purpose payload, it should be consequently evident that the invention can greatly support, or comprise the foundation of, a number of undersea activities that had heretofore been comparatively impossible.

Thus though it is with a view for broad-scale power generation from undersea currents that this invention has been conceived and presented, there remains the broader potential of arrangements of the system as indicated by the points raised prior. The preferred embodiments and example applications of the present invention should be therefore considered as exemplary and illustrative in nature, with further embodiments and applications neither restricting nor departing from the essential characteristics thereof. Thus the foregoing description of embodiments is not exclusively definitive; rather, the scope of the present invention is indicated in the following claims.

What is claimed is:

1. A submersible marine platform assembly that is transportable along the surface of a body of water to a site intended for submarine operational positioning and, by means of variable buoyancy and variable mechanical engagement of mooring equipment, descends to and ascends from an operational depth and orientation at which at least one payload device installed upon said platform is presented to and motivated by a sub-surface aquatic current, the overall system being further comprised of:
   (a) a platform structure, being substantially open in form in its main plane;
   (b) an arrangement of displacing volumes mounted to or formed by peripheral members of said platform structure, a plurality of said volumes being equipped for variability in displacement;
   (c) a ballast system and fluid-ejection means related thereto, for the control of displacement of said variable-displacement volumes;
   (d) a positive mechanical means of control of platform depth and angular orientation from the horizontal plane which includes:
      (1) a plurality of mooring lines;
      (2) a plurality of winch assemblies mounted to the platform assembly, each associated with at least one of said mooring lines;
   (e) at least one on-board electronic system associated with equipment mounted to or incorporated within said submersible platform assembly, such system incorporating circuitry and components for the control and monitoring of:
      (1) the plurality of winch assemblies;
      (2) the plurality of variably-buoyant volumes and associated ballast control system components;
      (3) at least one payload device installed upon said platform assembly as is to be delivered to and motivated by a sub-surface aquatic current;
      (4) communications equipment selected for the transmission and reception of electronic signal between the platform assembly and a remote facility;
   (f) at least one payload device, temporarily or permanently secured, as is to be delivered to said operational submarine position, depth and orientation by means of the platform assembly, said device being designed for the conversion of the kinetic energy of sub-surface aquatic current to electrical energy as an intermediate or final product.

2. The submersible platform system of claim 1 wherein the one or more energy-conversion payload devices are selected to have electrical energy as the final product of operation, and wherein the system is adapted for the direct transmission of such product from the platform assembly to a remote facility, the overall system further comprising:
   (a) at least one power conductor cable having been installed between said remote facility and the platform's area of mooring line anchorage;
   (b) a means of separable attachment of said cable to the platform assembly, via an electrical connector designed for underwater use.

3. The submersible platform system of claim 2 wherein the said electrical connector of said cable is separable by a remotely-operable mechanism selected for the purpose.

4. The submersible platform system of claim 2 wherein at least one power conductor cable between the said platform assembly and the said remote facility has its separable electrical connector mated while the platform resides at surface, the system being further comprised of:
   (a) an auxiliary cable-management buoy assembly equipped with a means of securing the free end of said cable at or near the water surface while not otherwise connected to the platform assembly;
   (b) a mooring tether for said buoy, anchored in the vicinity of platform operation;
   (c) a plurality of buoyant devices affixed to said power conductor cable so as to relieve the cable weight borne by said buoy assembly;
   (d) switchgear providing for the reception of electrical power from said remote facility during procedures of platform ascent and decent, and transmission of electrical power from the platform assembly to said remote facility when said platform is in a deployed position of operation.

5. The submersible platform system of claim 4 wherein the auxiliary cable-management buoy assembly is, for purposes of non-entanglement, further comprised of:

(a) a yoke attached to said buoy by a horizontally pivotable means, into which is incorporated the upper attachment point of the buoy's mooring tether, such attachment point extending into the water and up-current of the buoy;

(b) at least one fin attached to said buoy which causes the buoy to maintain a substantially stable position relative to other system components as a result of the combination of i) aquatic current acting upon said buoy, keeping said tether substantially taut; ii) the angular orientation, in the horizontal plane, of said fin relative to said yoke's axis of pivot; and iii) aquatic current acting upon the surfaces of said fin.

6. The submersible platform system of claim 1 wherein the at least one on-board control system is further comprised of a set of sensing devices that detect certain operational and environmental conditions selected from the group comprised of: i) velocity of aquatic current; ii) direction of aquatic current; iii) mooring line tension; iv) ambient water temperature; v) ambient water pressure; vi) visual conditions via an on-board camera; and vii) proximity of foreign objects via a sonar system.

7. The submersible platform system of claim 1 wherein signal transmission between said platform assembly and a remote facility, as a primary or backup sub-system, is accomplished by at least one electrically transmissive conductor installed between the two, such conductive means being selected from the group comprised of: i) an electronic overlaying of signal upon a power conductor, with electronic encoding and decoding devices located at both ends; ii) one or more additional conductors resident in a cable encompassing a power conductor; and iii) a dedicated signal cable.

8. The submersible platform system of claim 1 wherein signal transmission between said platform assembly and said remote facility, as a primary or backup sub-system, is accomplished by wireless means, the platform's communication system being further comprised of electronic equipment designed for underwater acoustical transpondence of signal to a counterpart set of such equipment residing at or near surface, such counterpart equipment being installed upon a surface object selected from the group comprised of: i) an unmanned buoyant structure, further equipped for through-air wireless transmission to a remote facility; ii) a manned vessel, further equipped for through-air wireless transmission to an at-shore facility; and iii) a manned vessel that itself comprises, at least temporarily, the remote station of control and monitoring.

9. The submersible platform system of claim 1 wherein signal transmission between said platform assembly and said remote facility, as a primary or backup sub-system, is accomplished by wireless means, the system being further comprised of:

(a) a tethered surface communications buoy, equipped for through-air wireless transmission to a remote facility;

(b) at least one electrically transmissive conductor installed between the platform and said buoy, such conductor being selected from the group comprised of: i) at least one dedicated conductor; and ii) the buoy's tether, with overlaid signal being electronically encoded and decoded by corresponding equipment installed on both platform and buoy.

10. The submersible platform system of claim 1 wherein the winches and mooring lines are adapted for platform operation in water depths exceeding twice the length of the platform assembly, the system further comprising:

(a) fairlead assemblies incorporated into the said winch assemblies;

(b) mooring line anchorage means being further selected from the group comprised of: i) direct and individual anchorage to the seabed, dimensionally spaced so as to preclude entanglement of said mooring lines; ii) direct and shared anchorage to a unitary framework or pedestal structure installed upon the seabed; and iii) indirect and shared anchorage to at least one intermediate framework suspended in the water column, said framework being directly moored to the seabed.

11. The submersible platform system of claim 10 wherein indication of maximum operational depth excursion for the platform assembly is conveyed to the said on-board control system by at least one sensor respondent to ambient water pressure.

12. The submersible platform system of claim 10 wherein indication of maximum operational depth excursion is accomplished by at least one sensor on board the platform assembly which, when brought into proximity of a physical feature resident in the mooring equipment, permits a corresponding signal to be sent to the said on-board control system.

13. The submersible platform system of claim 10 wherein additional features, by their interaction with surrounding aquatic forces, are incorporated into the platform assembly for greater positional stability during surface transit, descent, operational station-keeping and ascent, such features being selected from the group comprised of: i) a stream-lined pontoon; ii) a stream-lined cowling; iii) a thruster; iv) a static fin; and v) a mechanically operable diving plane.

14. The submersible platform system of claim 1 wherein the mooring lines are substantially cleared of marine growth by means of crushing features incorporated into at least one rotating component of each of the said winching assemblies.

15. The submersible platform system of claim 1 wherein said mooring lines and said winch assemblies are selected for a tractive relationship, the system further comprising:

(a) the composition of each said mooring line being selected from the group consisting of: i) at least one chain; ii) at least one wire rope; iii) at least one wire rope having periodically attached teeth or rib features; and iv) a combination of at least one wire rope and at least one chain;

(b) each winch assembly being further comprised of a set of tractional features, such set being selected from the group consisting of: i) at least one drum having surface features within the line-bearing groove of a sufficient form and pitch to mechanically engage periodic physical features resident in the mooring line assembly; and ii) at least one pair of cyclically-moving frictional surfaces that compress upon a mooring line;

(c) said winch assemblies further incorporating at least one idler wheel, drum, or other engagement feature that accommodates the requisite angular engagement or wrap of said mooring line onto or into said tractional features.

16. The submersible platform system of claim 15 wherein said mooring line engagement feature is mechanically lockable upon and releasable from said mooring line, the mechanism being further disengageable upon the reception of an electrical signal.

17. The submersible platform system of claim 15 wherein each mooring line of said platform assembly has its upper end retained at surface by means of a buoyant assembly throughout all stages of platform descent, operation, and ascent.

18. The submersible platform system of claim 17 in which the buoyant assembly employed for surface retention of said mooring lines is a composite structure, retaining all of said mooring lines of the platform assembly.

19. The submersible platform system of claim 18 in which the composite buoyant structure is further equipped with variably displaceable volumes for the purposes of submersion or semi-submersion of said structure.

20. The submersible platform system of claim 17 in which the buoyant assembly is a surface buoy dedicated to a single mooring line assembly and, for the purposes of non-entanglement, is maintained at surface in substantial separation from other components of the overall system by means of differentially-lengthened mooring lines or pairs of such, and also of features resident in said buoy, the buoy assembly further comprising:
 (a) a horizontally pivotable yoke into which is incorporated the attachment point of said mooring line, said attachment point extending beneath the surface and up-current of the buoy;
 (b) at least one fin attached to said buoy which causes the buoy to maintain a stable position relative to other buoyant system components as a result of the combination of i) surface current acting upon said buoy, keeping said mooring line substantially taut; ii) surface current acting upon the surfaces of said fin; and iii) the angular orientation, in the horizontal plane, of said fin relative to said yoke's axis of pivot.

21. The submersible platform system of claim 15 in which the free portion of mooring line assembly that has been tractively and descendingly traversed by its associated winch assembly is deposited into or onto a holding receptacle aboard the platform assembly.

22. The submersible platform system of claim 15 in which the free portion of mooring line that has been tractively and descendingly traversed by its associated winch assembly is permitted to hang freely from said winch assembly.

23. The submersible platform system of claim 22 in which the free portion of mooring line that has been tractively and descendingly traversed has been affixed with at least one finned or cupped device for proper down-current positioning with respect to positions of other major components in the system.

24. The submersible platform system of claim 22 in which the free portion of the mooring line that has been tractively and downwardly traversed has been affixed with at least one statically buoyant volume that assists in proper down-current positioning With respect to positions of other major components in the system.

25. The submersible platform system of claim 1 in which said system is adapted for a take-up relationship between said mooring lines and said winch assemblies, the system further comprising at least one drum incorporated within each winch assembly that acts as a reel for its associated mooring line.

26. The submersible platform system of claim 1 in which the site and depth of operation is characterized by the presence of sub-surface current that is substantially alternating in directional nature, the system being further comprised of:
 (a) the at least one said energy-conversion payload device being selected from the group comprised of: i) a device designed for self-presentation to such alternating current by a pivoting means perpendicular to the mean direction of marine current, such pivoting being independent of platform angular orientation; and ii) a device equipped with an impeller blades statically designed for or actuated to engage a bi-directional current flow;
 (b) the platform mooring lines and associated anchorage assemblies being further selected for the additional loads encountered during such transitions in aquatic current directionality.

27. The submersible platform system of claim 1 in which the site and depth of operation is characterized by the presence of sub-surface current that is substantially alternating in directional nature, wherein the platform assembly is rotated about a horizontal axis and thus presents its one or more energy-conversion payload devices to such alternating marine current by means further comprised of:
 (a) variable traversing of mooring lines by said winch assemblies during said alternation of aquatic current;
 (b) varying the displacement of at least one volume incorporated within the platform assembly during said alternation of aquatic current;
 (c) dimensional positioning of mooring line anchorages, commensurate with operational site conditions, so as to preclude entanglement during said alternation of current.

28. The submersible platform system of claim 1 wherein an emergency means of surfacing the platform assembly is provided for, via an emergency surfacing sub-system comprised of:
 (a) a standby power supply providing stored electrical energy, sized sufficiently for the powering of components designated as belonging to an emergency surfacing sub-system;
 (b) a sub-system for electronic control of components designated as associated with emergency surfacing operations;
 (c) such designated components being selected from the group minimally comprised of: i) an electro-mechanically operable valve associated with a pressurized air tank and pressurization circuit that ejects water from at least one volume designed for variable displacement; ii) at least one control and monitoring sub-system in communication with a remote facility; iii) at least one sensor designated as critical to an emergency surfacing operation; and iv) a component permitting the shutdown of at least one payload device or its energy product.

29. The submersible platform system of claim 28 wherein the emergency means of surfacing the platform assembly is further comprised of:
 (a) a means of remotely-actuable release of mooring lines, such means being selected from the group comprised of: i) a valve-actuated provision for a hydraulically-powered winch assembly in contact with an associated mooring line to rotate freely, such rotation being limited to speeds equating to a permissible rate of surfacing via a flow-limiting component resident within the associated hydraulic circuit; ii) a remotely-operable clutch device permitting a winch drum in direct contact with an associated mooring line to rotate freely, such rotation being mechanically limited to speeds equating to a permissible rate of surfacing; iii) a physical separation of anchored portion of mooring line from its associated winch assembly by means of a cutter mechanism acting upon said mooring line; iv) a physical disengagement of mooring line from its associated anchoring point by means of a remotely-operable and separable connection device; v) a physical disengagement of the mooring line from its associated anchor by means of a remotely-operable and separable connection device mounted along the length of said mooring line between point of anchoring and point of maximum operational depth excursion for the associated winch; vi) a physical disengagement of the mooring line from said winch assembly via the remotely-actuated release of a mechanical mooring line engagement mechanism resident in the winch assembly; and vii) a physical disengagement of the winch assembly from the platform assembly proper, such that both winch and mooring line are released from said platform assembly;

(b) a means of remotely-actuable release of any electrical cable connected to the platform assembly from an off-board location via a mechanical means associated with a connector assembly, the location of such point of connection and separation being selected from the group comprised of: i) the point at which such cable connects to said platform assembly; ii) the point at which such cable connects to a submarine anchorage; and iii) a point along the length of said cable between platform assembly and submarine anchorage.

30. The submersible platform system of claim 1 which has, with its one or more energy-conversion payload devices, been further equipped to have potential energy as the intended product of submarine operation, such energy having been converted from the kinetic energy of a sub-surface current to a form that is capable of storage and surface transport, the payload equipment being further selected from the group comprised of:

(a) at least one turbine payload device that, with electricity as an intermediate product, produces hydrogen as its final product, supplying at least one hydrogen storage payload assembly whose hydrogen content is conveyed to a surface vessel for further processing or transport;

(b) at least one turbine payload device that, with electricity as an intermediate product, produces hydrogen as its final product, directly supplying a surface vessel for further processing or transport via a fluid conductor;

(c) at least one turbine payload device that produces electricity as its primary product, such product energizing an on-board system that produces hydrogen therefrom;

(d) at least one turbine payload device that produces electricity as its primary product, such product charging one or more on-board battery devices, such batteries being conveyed to another vessel when charged;

(e) at least one turbine payload device that produces electricity as its primary product, such product being conveyed directly to a another vessel and its one or more electrical storage or conversion devices by means of an electrical conductor whilst the platform is at operational depth.

31. The method of delivering and retrieving devices that convert the kinetic energy of sub-surface aquatic current into a transmissible or transportable form of energy, between an accessible position at or above the water surface and an operational depth and angular position within the water column, by means of a submersible payload-bearing platform, comprising the steps of:

(a) engaging of pre-positioned mooring lines to said platform's winch assemblies while said platform is at surface, said mooring lines having their upper ends retained at surface by buoyant structures;

(b) lowering of the platform by means of i) decreasing buoyancy via an on-board ballast control system and ii) the simultaneous mechanical action of said winch assemblies upon said mooring lines;

(c) remote commanding of the platform to a preferred operational depth and angular attitude ranging from horizontal to vertical;

(d) operating and monitoring of said platform, while at depth, by a remote facility;

(e) operating and monitoring of said energy-conversion devices, while at depth, by a remote facility;

(f) ascending of said platform and its payload of energy-conversion devices in a manner substantially in the reverse of the above, for maintenance, equipment upgrades, or avoidance of adverse environmental conditions;

(g) surface disengagement of said mooring lines from said winch assemblies in the event that transport to another location is necessitated by operational, environmental or servicing requirements.

32. The method of claim 31, further comprising:

(a) pre-positioned sub-sea power and signal cables being extended to the water surface, such being retained at surface in the absence of the platform assembly;

(b) connection or disconnection of said cables to said platform while such is still at surface.

33. The method of claim 32, further comprising:

(a) supply of electrical energy from a remote facility to the platform assembly during procedures of descent and ascent;

(b) supply of electrical energy from the platform assembly and its payload of energy-conversion devices to a remote facility when said platform assembly is in a submarine operational position.

34. The method of emergency surfacing of a submersible, variably-buoyant and engageably-tethered platform assembly equipped with devices that convert the kinetic energy of submarine aquatic current into a transmissible or transportable form of energy, comprising:

(a) passively and statically displacing volumes being incorporated into the platform assembly, such volumes assisting the elevation of said platform assembly from a submarine depth to a position near the surface, regardless of other sub-system functionalities;

(b) the said platform assembly having been engageably-tethered by means of a plurality of winch assemblies mechanically engaged with associated mooring lines;

(c) the release of such mooring lines from said winch assemblies being accomplished by hydraulic valve actuation, allowing the drum or drums of said winch assemblies to freely rotate, though at a speed controlled by flow-limiting valves of the hydraulic circuit;

(d) a supply of stored electrical energy for the energizing of critical components on-board the platform, such that certain control sub-systems, valve operators, communications sub-systems, sensors, and other components designated as critical to an emergency surfacing operation may be remotely commanded and energized regardless of the presence of normal power sources;

(e) an on-board supply of stored and pressurized air that displaces certain variably-displaceable volumes of the platform to promote its overall buoyancy.

* * * * *